US009293033B2

(12) United States Patent
Bommer et al.

(10) Patent No.: US 9,293,033 B2
(45) Date of Patent: *Mar. 22, 2016

(54) WIRELESS FUEL SENSOR SYSTEM

(71) Applicant: The Boeing Company, Chicago, IL (US)

(72) Inventors: Jason P. Bommer, Tacoma, WA (US); David William Minteer, Lake Tapps, WA (US); Richard J. Nesting, Everett, WA (US); Arun Ayyagari, Seattle, WA (US); Richard Neal Bostwick, North Bend, WA (US); Andrew Michael Robb, Ravensdale, WA (US)

(73) Assignee: THE BOEING COMPANY, Chicago, IL (US)

( * ) Notice: Subject to any disclaimer, the term of this patent is extended or adjusted under 35 U.S.C. 154(b) by 275 days.

This patent is subject to a terminal disclaimer.

(21) Appl. No.: 13/942,981

(22) Filed: Jul. 16, 2013

(65) Prior Publication Data

US 2015/0022373 A1    Jan. 22, 2015

(51) Int. Cl.

| | |
|---|---|
| *G08C 19/04* | (2006.01) |
| *G08C 19/10* | (2006.01) |
| *G08B 21/00* | (2006.01) |
| *B60Q 1/00* | (2006.01) |
| *G08C 17/02* | (2006.01) |
| *H04Q 9/00* | (2006.01) |
| *B64D 37/00* | (2006.01) |
| *H02J 17/00* | (2006.01) |

(52) U.S. Cl.
CPC .............. *G08C 17/02* (2013.01); *B64D 37/00* (2013.01); *H04Q 9/00* (2013.01); *H02J 17/00* (2013.01)

(58) Field of Classification Search
USPC ............ 235/435–495; 455/41.1–45; 600/561
See application file for complete search history.

(56) References Cited

U.S. PATENT DOCUMENTS

| | | | |
|---|---|---|---|
| 3,728,897 A | 4/1973 | Wallman | |
| 4,173,893 A | 11/1979 | Hedrick | |
| 4,841,227 A | 6/1989 | Maier | |
| 5,051,921 A | 9/1991 | Paglione | |
| 5,627,380 A | 5/1997 | Crowne | |
| 5,708,424 A | 1/1998 | Orlando et al. | |
| 5,739,416 A | 4/1998 | Hoenk | |
| 6,101,873 A | 8/2000 | Kawakatsu et al. | |
| 6,335,690 B1 | 1/2002 | Konchin et al. | |
| 6,720,866 B1 * | 4/2004 | Sorrells et al. | ............... 340/10.4 |

(Continued)

FOREIGN PATENT DOCUMENTS

| | | |
|---|---|---|
| EP | 0690293 A2 | 1/1996 |
| EP | 2642259 A1 | 9/2013 |

OTHER PUBLICATIONS

Extended European Search Report, dated Jan. 16, 2014, regarding Application No. EP13188531.1, 6 pages.

(Continued)

*Primary Examiner* — Firmin Backer
*Assistant Examiner* — Jerold Murphy
(74) *Attorney, Agent, or Firm* — Yee & Associates, P.C.

(57) ABSTRACT

A method for generating sensor data is presented. A number of wireless power signals is sent to a group of sensor units. A number of wireless data collection signals is sent to the group of sensor units after the number of wireless power signals have been sent to the group of sensor units. Sensor data in a number of wireless response signals is received from the group of sensor units.

11 Claims, 16 Drawing Sheets

(56) References Cited

U.S. PATENT DOCUMENTS

| | | | |
|---|---|---|---|
| 8,022,793 B2 | 9/2011 | Olson et al. | |
| 8,026,857 B2 | 9/2011 | Bommer | |
| 8,040,243 B2 | 10/2011 | Bommer et al. | |
| 8,134,469 B2 * | 3/2012 | Bucciero | 340/612 |
| 8,237,548 B2 | 8/2012 | Fay et al. | |
| 8,384,521 B2 | 2/2013 | Matsen et al. | |
| 8,416,090 B2 | 4/2013 | Bucciero | |
| 2003/0000303 A1 | 1/2003 | Livingston et al. | |
| 2003/0234730 A1 | 12/2003 | Arms et al. | |
| 2004/0036487 A1 | 2/2004 | Heremans et al. | |
| 2005/0022581 A1 | 2/2005 | Sunshine | |
| 2006/0022800 A1 * | 2/2006 | Krishna et al. | 340/10.2 |
| 2010/0177801 A1 | 7/2010 | Geren et al. | |
| 2010/0318243 A1 | 12/2010 | Lewis et al. | |
| 2011/0018686 A1 * | 1/2011 | Fahley et al. | 340/10.1 |
| 2011/0199976 A1 * | 8/2011 | Mitchell et al. | 370/328 |
| 2012/0105086 A1 | 5/2012 | Bommer et al. | |
| 2012/0158321 A1 | 6/2012 | Bommer et al. | |
| 2014/0008989 A1 | 1/2014 | Bommer et al. | |
| 2014/0104079 A1 | 4/2014 | Bommer et al. | |

OTHER PUBLICATIONS

Notice of Allowance, dated Jan. 16, 2015, U.S. Appl. No. 13/650,380, 26 pages.
Bommer et al., "Wireless Power Harvesting Along Multiple Paths in a Reverberent Cavity" U.S. Appl. No. 13/533,934, filed Jun. 26, 2012, 23 pages.
Bommer et al., "Fuel Tank Monitoring," U.S. Appl. No. 13/650,380, filed Oct. 12, 2012, 49 pages.
Robb et al., "Highly Resistive Wiring for Inherent Safety from Electromagnetic Threats," U.S. Appl. No. 12/924,287, filed Sep. 23, 2010, 15 pages.
Bommer et al., "Wireless Liquid Quantity Measurement System," U.S. Appl. No. 12/970,664, filed Dec. 16, 2010, 30 pages.
Extended European Search Report, dated Apr. 17, 2015, regarding Application No. EP14174603.2, 4 pages.

* cited by examiner

WIRELESS FUEL SENSOR SYSTEM

BACKGROUND INFORMATION

1. Field

The present disclosure relates generally to aircraft and, in particular, to sensor systems in aircraft. Still more particularly, the present disclosure relates to a method and apparatus for a wireless sensor system for measuring fuel quantity in a fuel tank of an aircraft.

2. Background

In operating an aircraft, various types of information about the aircraft and the environment around the aircraft is identified. This information may include, for example, airspeed, cabin temperature, temperature outside of the aircraft, humidity, air pressure, fuel level, engine temperature, the configuration of control surfaces, and other suitable types of information. This information may be identified using sensor systems in the aircraft.

Currently, sensors are often connected to other equipment through wires and cables. For example, wires may be located in the wing of an aircraft. These wires may extend from portions of the sensor system located in the fuselage of the aircraft to sensors in fuel tanks or other locations in the wing of the aircraft. Additionally, other equipment also may be located in the fuel tank or wing to facilitate making measurements and generating sensor data.

In manufacturing aircraft, routing wires may take longer than desired to install sensors in the fuel tank. Additionally, use of wires and other equipment associated with the wires also may add additional weight to the aircraft. For example, additional structures may be needed to provide for a desired routing and separation of wires to reduce arcing or discharge that may occur from environmental effects. These environmental effects may include electromagnetic events such as lightning or static electricity.

Further, the use of wires also may result in the forming of openings in the fuel tank to route the wires to sensors in the fuel tank. The formation and location of these openings may take more time and expense than desired during the installation of the sensors in the fuel tank of the aircraft. As a result, the increased time and expense involved in installing these components may increase the manufacturing time for the aircraft more than desired. Additionally, the cost of the aircraft also may be greater than desired.

Further, the wires and number of openings for the wires may also result in more maintenance than desired while the aircraft is in use. For example, additional inspections may be performed on the seals for the openings and the integrity of the wires. Also, wires and seals may require replacement at times during the life of the aircraft. Consequently, the time and cost of maintenance also may be greater than desired.

Therefore, it would be desirable to have a method and apparatus that take into account at least some of the issues discussed above, as well as other possible issues.

SUMMARY

In one illustrative embodiment, an apparatus comprises a sensor collector configured to send a number of wireless power signals to a group of sensor units. The sensor controller is further configured to send a number of wireless data collection signals to the group of sensor units after the number of wireless power signals have been sent to the group of sensor units. The sensor collector is still further configured to receive sensor data in a number of wireless response signals from the group of sensor units.

In another illustrative embodiment, an aircraft fuel sensor system comprises a group of sensor units, a wireless system, and a sensor controller. The group of sensor units is located in a fuel tank of an aircraft. The wireless system is configured to send a number of wireless power signals and a number of wireless data collection signals to the group of sensor units under a control of the sensor controller and receive sensor data in a number of wireless response signals sent from the group of sensor units. The sensor controller is configured to cause the wireless system to send the number of wireless power signals to the group of sensor units. The sensor controller is further configured to cause the wireless system to send the number of wireless data collection signals to the group of sensor units after the number of wireless power signals have been sent to the group of sensor units. The sensor controller is still further configured to receive sensor data transmitted wirelessly in the number of wireless response signals from the wireless system.

In yet another illustrative embodiment, a sensor system comprises a sensor, an antenna system, an energy harvesting device, and a controller. The antenna system is physically connected to the sensor. The antenna system is configured to send and receive wireless signals. The energy harvesting device is configured to derive energy from the wireless signals received. The controller is configured to control the sensor to make a measurement, save the measurement as sensor data, and send the sensor data in the wireless signals.

In another illustrative embodiment, a method for generating sensor data is presented. A number of wireless power signals is sent to a group of sensor units. A number of wireless data collection signals is sent to the group of sensor units after the number of wireless power signals have been sent to the group of sensor units. The sensor data in a number of wireless response signals is received from the group of sensor units.

In still another illustrative embodiment, a method for generating sensor data is presented. A number of wireless power signals are received at a sensor unit. A number of measurements is made using a sensor at the sensor unit after receiving the number of wireless power signals. The number of measurements is stored as the sensor data. The sensor data is transmitted in a number of wireless sensor data signals when a number of wireless data collection signals are received.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that the use of wireless sensors may be employed to reduce issues that arise from the use of wires in an aircraft, such as those that may extend through a wing to fuel tanks and aircraft. For example, by reducing or eliminating the use of wires for sensors in fuel tanks, the weight may be reduced in an aircraft to increase the performance of the aircraft. For example, an increase in range, maneuverability, and other types of performance for the aircraft may occur. Further, the amount of time needed to install sensors in fuel tanks for an aircraft also may be reduced.

The illustrative embodiments recognize and take into account that currently, wireless sensors used in fuel tanks may take the form of capacitive probes. A capacitive probe may measure the level of fuel in a fuel tank.

The illustrative embodiments provide a method and apparatus for generating sensor data. For example, an apparatus may include a sensor controller. The sensor controller is configured to send a number of wireless power signals to a group of sensor units. The wireless controller is configured to send a number of wireless data collection signals to the group of sensor units after the number of wireless power signals have been sent the group of sensor units. The sensor controller is also configured to receive sensor data transmitted wirelessly in a number of wireless response signals from the group of sensor units.

Figure 1:
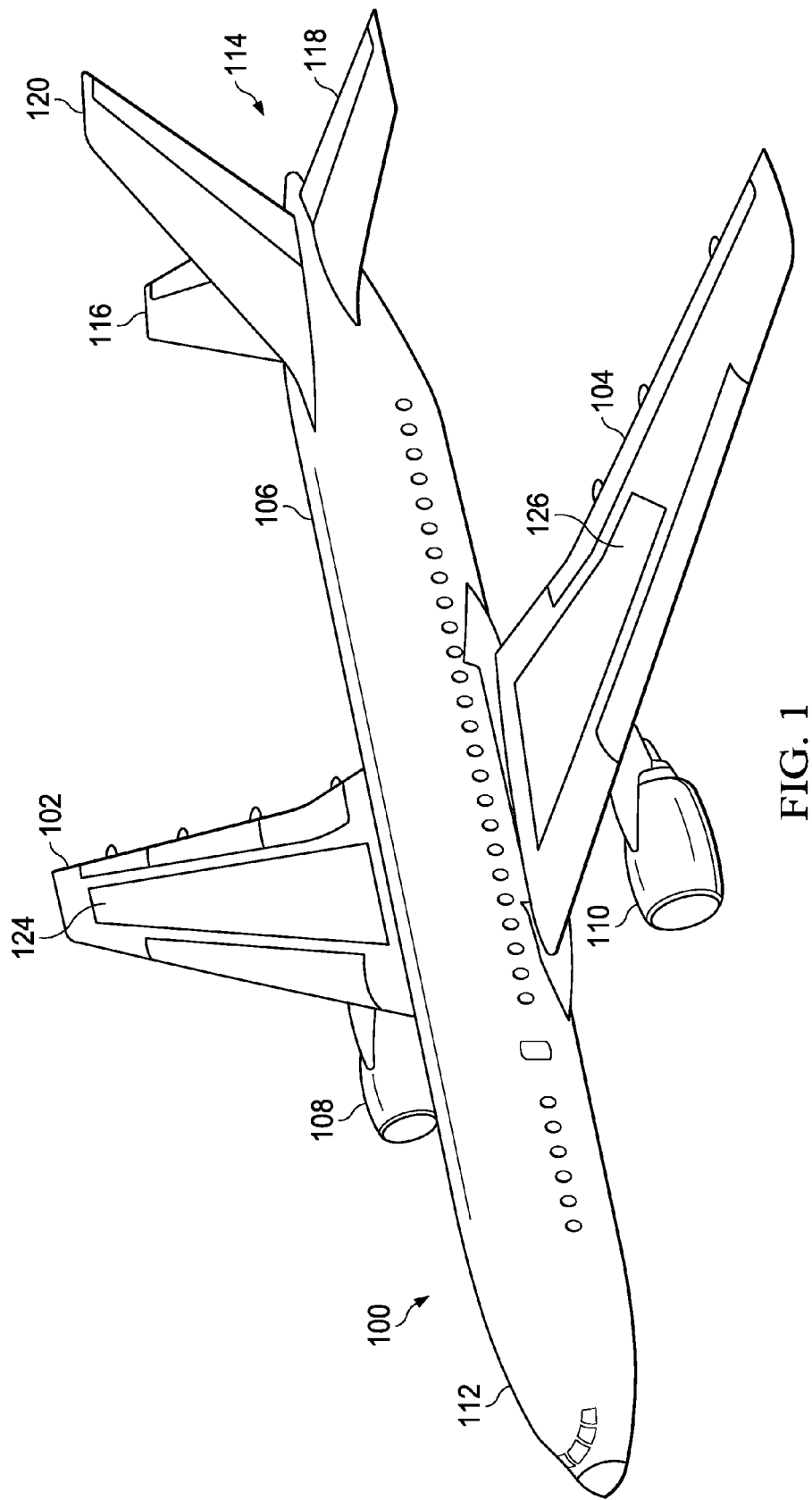
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

Aircraft 100 is an example of an aircraft in which a sensor system may be implemented in accordance with an illustrative embodiment. In this illustrative example, a sensor system may be implemented in aircraft 100 to monitor at least one of aircraft 100 or the environment around aircraft 100.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

In this illustrative example, fuel tank 124 and fuel tank 126 are examples of parts of aircraft 100 that may be monitored by the sensor system. In particular, the sensor system may monitor the fuel level as well as other information about fuel tank 124 and fuel tank 126. In this manner, the sensor system may be an aircraft fuel sensor system in this illustrative example.

Figure 2:
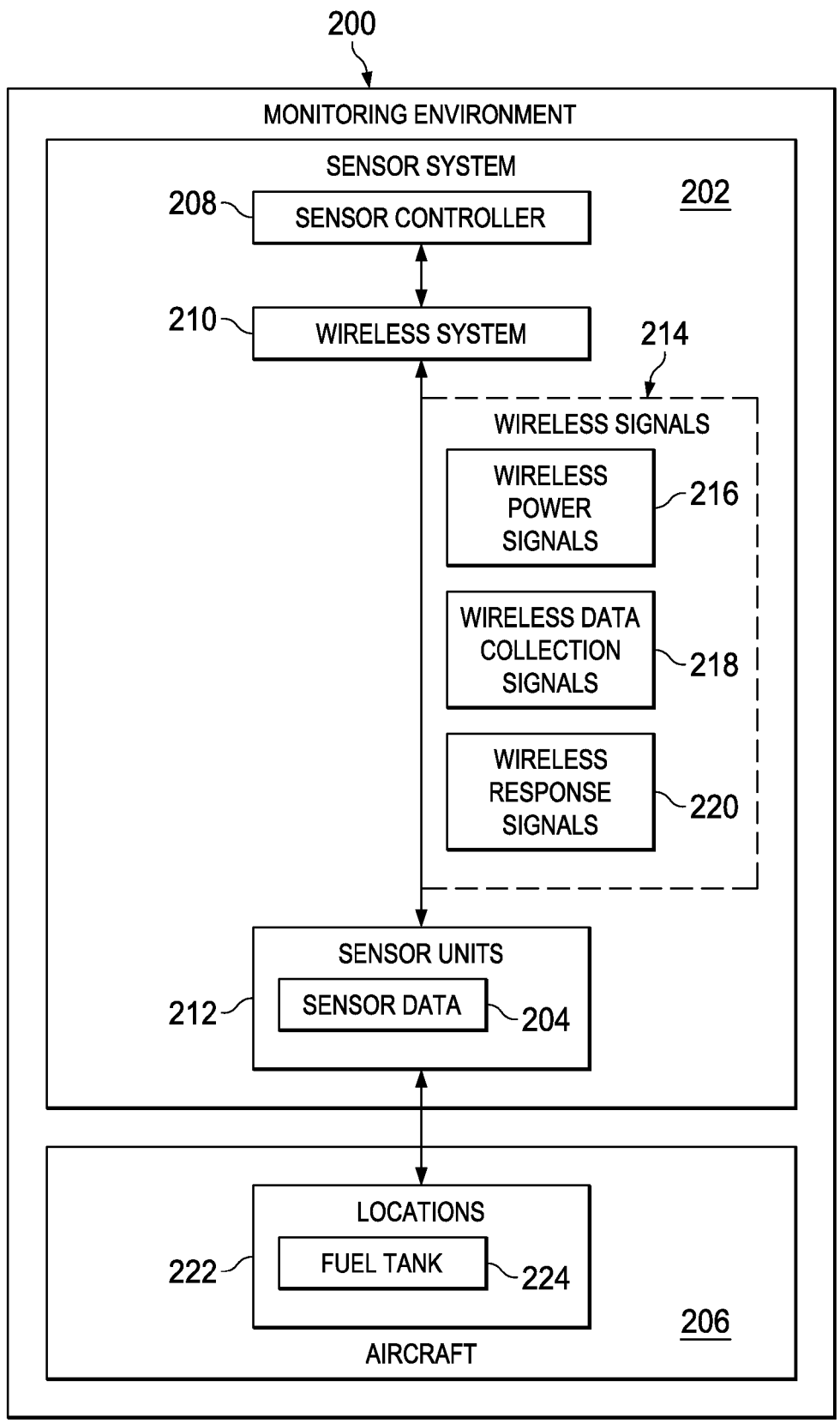
FIG. 2 is an illustration of a block diagram of a monitoring environment in accordance with an illustrative embodiment.

Turning now to FIG. 2, an illustration of a block diagram of a monitoring environment is depicted in accordance with an illustrative embodiment. In this illustrative example, monitoring environment 200 includes sensor system 202 that is configured to generate sensor data 204 about aircraft 206. Aircraft 100 in FIG. 1 is an example of one manner in which aircraft 206 shown in block form may be implemented.

As depicted, sensor system 202 is physically associated with aircraft 206. When one component is "physically associated" with another component, the association is a physical association in the depicted examples. For example, a first component, such as sensor system 202, may be considered to be physically associated with a second component, such as aircraft 206, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, extension of the second component, or both.

In the illustrative example, sensor system 202 includes a number of components used to generate sensor data 204. As depicted, sensor system 202 includes sensor controller 208, wireless system 210, and sensor units 212.

Sensor controller 208 is configured to control the generation of sensor data 204 by sensor units 212. As depicted, sensor controller 208 may be implemented in software, hardware, firmware or a combination thereof. When software is used, the operations performed by sensor controller 208 may be implemented in program code configured to run on a processor unit. When firmware is used, the operations performed by sensor controller 208 may be implemented in program code and data and stored in persistent memory to run on a processor unit. When hardware is employed, the hardware may include circuits that operate to perform the operations in sensor controller 208.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Wireless system 210 is a hardware system and configured to facilitate the transmission of wireless signals 214. In the illustrative examples, wireless signals 214 are described with respect to radio frequency signals. Of course, wireless signals 214 may take other forms in addition to or in place or radio frequency signals. For example, wireless signals 214 may be at least one of radio frequency signals, optical signals, infrared signals, or other suitable types of wireless signals.

Wireless system 210 may have a suitable architecture or arrangement. For example, wireless system 210 may be a wireless network.

As depicted, wireless system 210 is configured to transmit a number of wireless power signals 216 and a number of wireless data collection signals 218 to the group of sensor units 212 under a control of sensor controller 208 and receive sensor data 204 transmitted wirelessly from the group of sensor units 212 in a number of wireless response signals 220. These signals are only examples of wireless signals 214 and not meant to be exhaustive examples of wireless signals 214.

As used herein, a "number of," when used with reference to items, means one or more items. For example, a number of wireless power signals 216 is one or more wireless power signals in wireless power signals 216. In a similar fashion, a "group," when used with reference to items, also means one or more items.

As depicted, sensor units 212 are in locations 222 in or on aircraft 206. In one illustrative and non-limiting example, the group of sensor units 212 may be located in fuel tank 224 in locations 222.

In the illustrative example, the group of sensor units 212 derives energy to operate from the number of wireless power signals 216. In other words, the number of wireless power signals 216 provides power by transferring energy to the group of sensor units 212 in a wireless fashion. In the illustrative example, the number of wireless power signals 216 may be unmodulated. In other words, information, such as commands or data, is not included within wireless power signals 216.

As depicted, one wireless power signal in the number of wireless power signals 216 may be sufficient to provide energy to the group of sensor units 212. In particular, the energy is electrical energy.

In some examples, one or more additional wireless power signals in the number of wireless power signals 216 may be used to provide power for one or more of sensor units 212 in the group of sensor units 212. In this case, the use of multiple wireless power signals may be in the form of plurality of sequential wireless power signals in the number of wireless power signals 216. The use of multiple wireless signals may be referred to as a trickle charging process for the group of sensor units 212. With the use of multiple wireless power signals, the signals may be sent at lower levels and may shorten in duration.

Further, in some cases, one sensor unit in the group of sensor units 212 may be powered using a single wireless power signal in the number of wireless power signals 216, while another sensor unit in the group of sensor units 212 may be powered using multiple wireless signals in the number of wireless power signals 216. In other words, the transmission of wireless power signals 216 may be mixed within the group of sensor units 212.

The energy derived from the number of wireless power signals 216 may be used by the group of sensor units 212 to perform one or more operations. For example, when the group of sensor units 212 receives the number of wireless power signals 216, the group of sensor units 212 makes measurements and stores the measurements as sensor data 204.

The group of sensor units 212 sends sensor data 204 to sensor controller 208 through wireless system 210 when the group of sensor units 212 receives the number of wireless data collection signals 218 from wireless system 210. As depicted, the number of wireless data collection signals 218 may be modulated to include information. This information may provide commands, data, and other information needed to collect sensor data 204 from sensor units 212. As depicted, sensor data 204 is sent in the number of wireless response signals 220 to sensor controller 208 through wireless system 210.

Sensor controller 208 processes sensor data 204. Sensor controller 208 may perform operations including at least one of filtering, analysis, sending sensor data 204 to a computer in aircraft 206, generating an alert, storing sensor data 204 in a database, sending sensor data 204 to a location remote to aircraft 206, displaying sensor data 204, or other suitable operations.

In these illustrative examples, sensor system 202 may be configured to meet a policy. The policy is one or more rules. The policy may be, for example, a safety policy regarding operations in aircraft 206. The safety policy may include rules with respect to the construction of components, the operation of components, and other suitable rules. In one illustrative example, the safety policy may be directed towards the architecture of sensor system 202 and may be a standard defining safety certification requirements. The different components in sensor system 202 may be configured to meet this type of standard or other standards.

Figure 3:
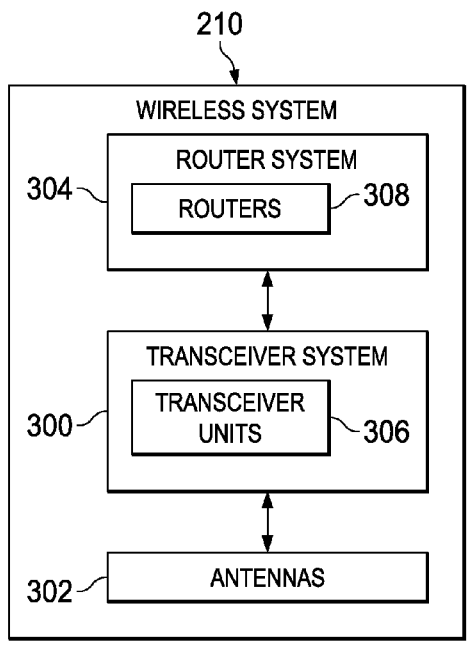
FIG. 3 is an illustration of a block diagram of a wireless system in accordance with an illustrative embodiment.

Turning next to FIG. 3, an illustration of a block diagram of a wireless system is depicted in accordance with an illustrative embodiment. An example of an implementation for wireless system 210 is shown in this figure. As depicted, wireless system 210 includes transceiver system 300, a group of antennas 302, and router system 304.

In the illustrative example, transceiver system 300 is a hardware system that may include software. As depicted, transceiver system 300 comprises a group of transceiver units 306. A transceiver unit is configured to transmit wireless signals 214 in FIG. 2 through the group of antennas 302 and receive wireless signals 214 through the group of antennas 302. In some examples, a separate transmitter and receiver may be used to implement a transceiver unit.

The group of antennas 302 is physically associated with transceiver system 300. For example, the group of antennas 302 may be connected to the housing of a structure in which transceiver units 306 are located. In other illustrative examples, one or more of antennas 302 in the group of antennas 302 may be connected to transceiver units 306 by wires. In other words, the group of antennas 302 does not have to be in the same location or locations as transceiver units 306 in different illustrative examples.

As depicted, router system 304 may be comprised of a group of routers 308. In the illustrative examples, a router in the group of routers 308 is configured to send information to sensor controller 208 in FIG. 2. The group of routers 308 may provide routing functions similar to that of routers used in computer networks. Further, if sensor controller 208 is distributed in different locations or one or more additional sensor controllers are present, the group of routers 308 may route sensor data 204 in FIG. 2 to an appropriate location based on at least one of an addressing scheme, a group of rules, or some other scheme.

Further, the group of routers 308 also may process sensor data 204 received from sensor units 212 in FIG. 2. For example, the group of routers 308 may aggregate sensor data 204 from the group of sensor units 212. The group of routers 308 also may place sensor data 204 into a format for use by sensor controller 208. In still other illustrative examples, the group of routers 308 may filter, sample, or otherwise process sensor data 204.

Figure 4:
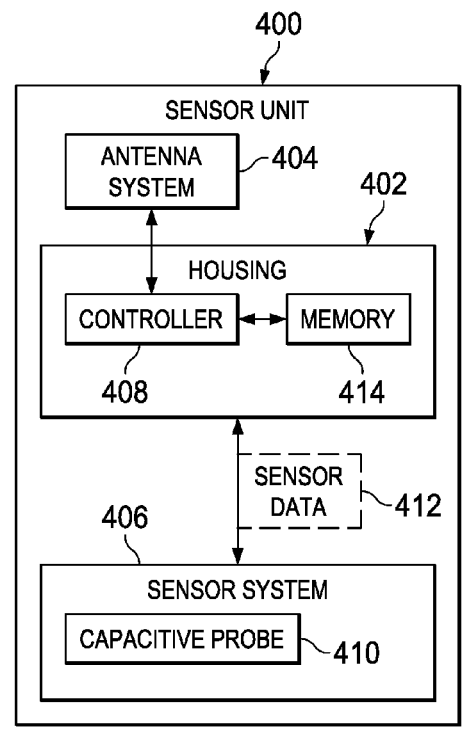
FIG. 4 is an illustration of a block diagram of a sensor unit in accordance with an illustrative embodiment.

With reference now to FIG. 4, an illustration of a block diagram of a sensor unit is depicted in accordance with an illustrative embodiment. Sensor unit 400 is a hardware device and is an example of a sensor unit in sensor units 212 in FIG. 2. In this illustrative example, sensor unit 400 includes housing 402, antenna system 404, sensor system 406, and controller 408.

Housing 402 is a structure that is physically associated with the other components. In particular, housing 402 may provide support for the other components.

Antenna system 404 is a hardware system and is configured to send and receive signals such as wireless signals 214 in FIG. 2. Antenna system 404 is comprised of one or more antennas. Antenna system 404 may be mounted on housing 402 in the illustrative examples. In other illustrative examples, some or all of antenna system 404 may be located within housing 402.

Sensor system 406 is a hardware system. As depicted, sensor system 406 includes one or more sensors. In particular, sensor system 406 may include capacitive probe 410. Capacitive probe 410 is configured to measure fluid levels. For example, capacitive probe 410 may be used to measure a level of fuel in a fuel tank.

Controller 408 is a hardware device configured to control the operation of sensor system 406. As depicted, controller 408 receives energy through a wireless signal received on antenna system 404. In these illustrative examples, controller 408 may include a receiver and a transmitter in addition to logic circuits for controlling the operation of sensor system 406.

As depicted, controller 408 is configured to cause sensor system 406 to make measurements that result in the generation of sensor data 412. For example, controller 408 may send energy to sensor system 406 that causes sensor system 406 to make measurements and generate sensor data 412. In the illustrative example, sensor data 412 is an example of sensor data 204 in FIG. 2.

In this illustrative example, controller 408 may receive sensor data 412 and store sensor data 412 in memory 414. Additionally, controller 408 also may transmit sensor data over a wireless signal through antenna system 404.

Figure 5:
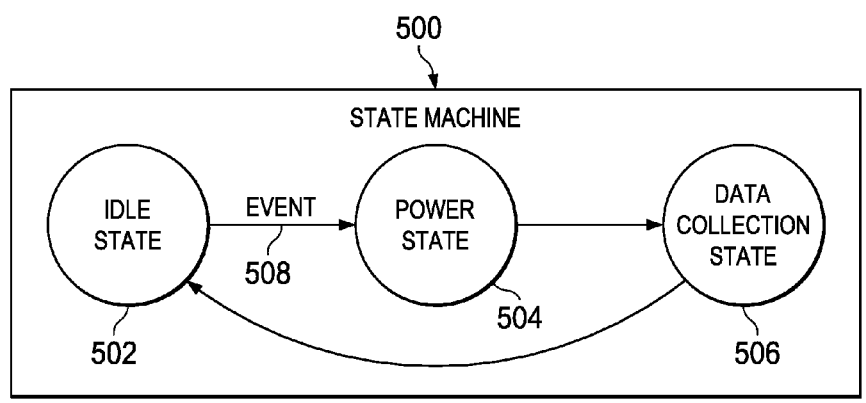
FIG. 5 is an illustration of states for a sensor system used to generate sensor data in accordance with an illustrative embodiment.

Turning now to FIG. 5, an illustration of states for a sensor system used to generate sensor data is depicted in accordance with an illustrative embodiment. In this illustrative example, state machine 500 includes states that may be implemented in sensor system 202 in FIG. 2. These states may be used to generate sensor data 204 in FIG. 2 in a desired manner.

In this illustrative example, state machine 500 has a number of different states. As depicted, state machine 500 includes idle state 502, power state 504, and data collection state 506.

In this illustrative example, state machine 500 begins in idle state 502. Event 508 causes state machine 500 to shift from idle state 502 to power state 504. Event 508 may take various forms. As depicted, event 508 may be a periodic event or a non-periodic event. For example, event 508 may be the expiration of a timer, the receipt of a user input, a change in a selected parameter, or some other suitable event.

In power state 504, sensor controller 208 sends a group of wireless power signals 216 using wireless system 210 as shown in block form in FIG. 2. The group of wireless power signals 216 has a power level configured to provide a desired level of energy transfer to a group of sensor units 212.

After the transmission of the group of wireless power signals 216, state machine 500 shifts from power state 504 to data collection state 506. In data collection state 506, sensor controller 208 sends a group of wireless data collection signals 218 to the group of sensor units 212 using wireless system 210 as shown in block form in FIG. 2. The group of wireless data collection signals 218 causes the group of sensor units 212 to send sensor data 204 in wireless response signals 220 as shown in block form in FIG. 2. Thereafter, state machine 500 returns to idle state 502 until event 508 occurs.

Figure 6:
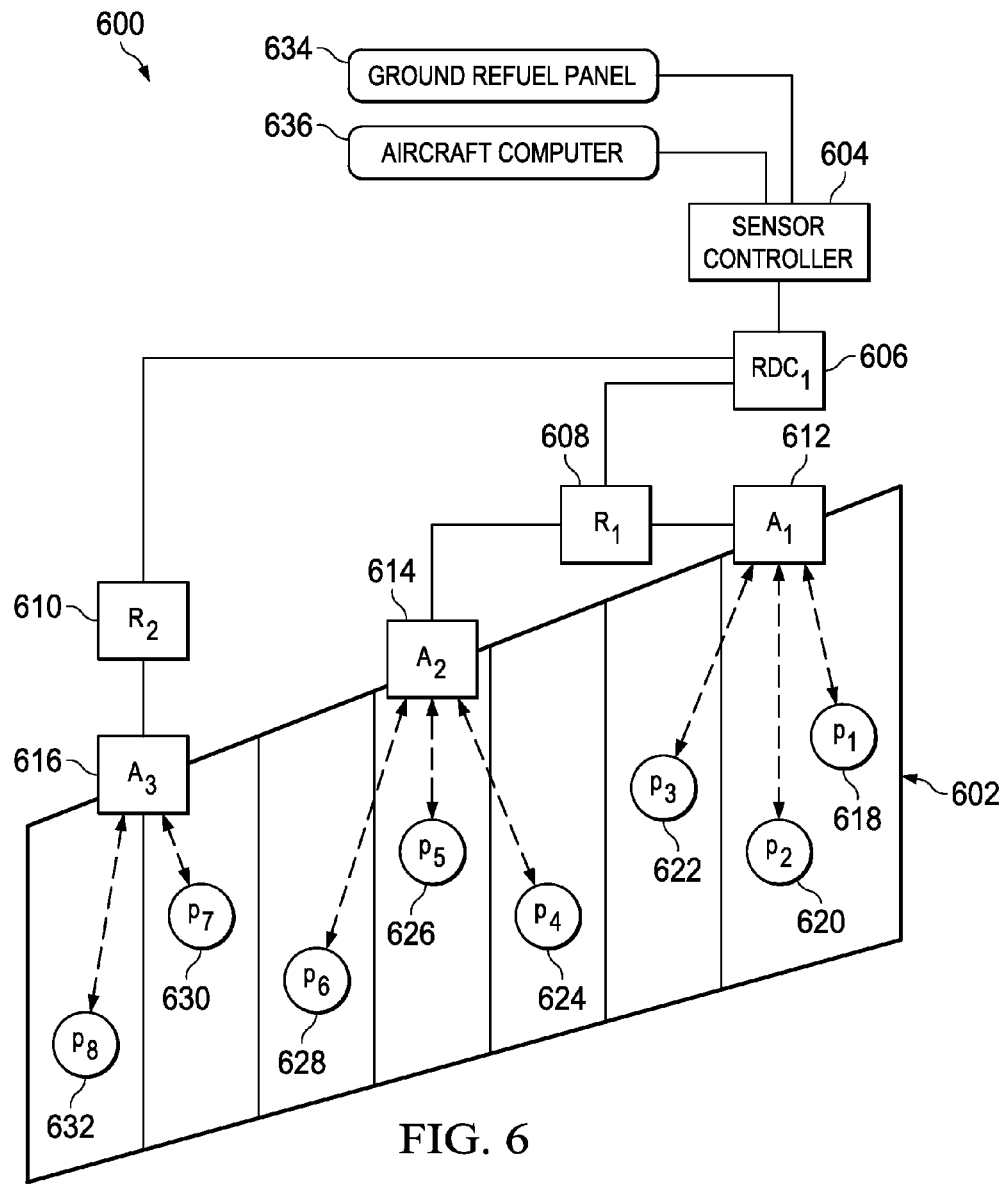
FIG. 6 is an illustration of a sensor system in accordance with an illustrative embodiment.

Turning now to FIG. 6, an illustration of a sensor system is depicted in accordance with an illustrative embodiment. In this illustrative example, sensor system 600 is an example of an implementation for sensor system 202 in FIG. 2. As depicted, sensor system 600 is configured to generate sensor data in fuel tank 602.

In the illustrative example, sensor system 600 includes a number of different components. As depicted, sensor system 600 includes sensor controller 604, remote data concentrator 606, reader $R_1$ 608, reader $R_2$ 610, antenna 612, antenna 614, antenna 616, sensor unit 618, sensor unit 620, sensor unit 622, sensor unit 624, sensor unit 626, sensor unit 628, sensor unit 630, and sensor unit 632.

In these illustrative examples, sensor unit 618, sensor unit 620, sensor unit 622, sensor unit 624, sensor unit 626, sensor unit 628, sensor unit 630, and sensor unit 632 are located in fuel tank 602. These sensor units receive energy through radio frequency signals transmitted by antenna 612, antenna 614, and antenna 616. These sensor units generate sensor data and transmit the sensor data over radio frequency signals to antenna 612, antenna 614, and antenna 616. In particular, these sensor units may be implemented using hardware for radio frequency identifier (RFID) tags.

In these illustrative examples, antenna 612, antenna 614, and antenna 616 may be located in the interior of fuel tank 602, outside of fuel tank 602, or some combination thereof. The location and configuration of antenna 612, antenna 614, and antenna 616 is selected such that these antennas are able to transmit radio frequency signals to the sensor units and receive radio frequency signals from the sensor units.

In this illustrative example, antenna 612 communicates with sensor unit 618, sensor unit 620, and sensor unit 622 using radio frequency signals. Antenna 614 communicates with sensor unit 624, sensor unit 626, and sensor unit 628. Antenna 616 communicates with sensor unit 630 and sensor unit 632. Of course, more than one antenna may communicate with the same sensor unit in some implementations. For example, antenna 612 and antenna 614 may both communicate with sensor unit 622 in another illustrative example.

Reader $R_1$ 608 and reader $R_2$ 610 are examples of hardware devices that may be implemented in transceiver system 300 in FIG. 3. For example, reader $R_1$ 608 and reader $R_2$ 610 may include transceiver units such as transceiver units 306 in FIG. 3. In these illustrative examples, these readers may be implemented using radio frequency identifier tag readers. Reader $R_1$ 608 and reader $R_2$ 610 are configured to transmit radio frequency signals over antenna 612, antenna 614, and antenna 616 within fuel tank 602. As depicted, reader $R_1$ 608 is connected to antenna 612 and antenna 614. Reader $R_2$ 610 is connected to antenna 616.

As depicted, reader $R_1$ 608 and reader $R_2$ 610 are configured to transmit radio frequency signals to provide energy to the sensor units in a wireless fashion. Additionally, reader $R_1$ 608 and reader $R_2$ 610 are configured to transmit radio frequency signals to cause the sensor units to transmit sensor data.

Remote data concentrator 606 is an example of a router in routers 308 in FIG. 3. As depicted, remote data concentrator 606 is connected to reader $R_1$ 608 and reader $R_2$ 610. In this illustrative example, remote data concentrator 606 also performs processing of sensor data generated by the sensor units.

Sensor controller 604 is an example of sensor controller 208 in FIG. 2. Sensor controller 604 may process the sensor data for use in other locations in the aircraft. For example, the sensor data may indicate a fuel level in fuel tank 602. Sensor controller 604 may identify a quantity of fuel present in fuel tank 602 from the fuel level. This information may be displayed on ground refuel panel 634. In particular, a quantity of fuel, an indication of whether refueling is needed after the flight of an aircraft, and other information may be displayed on ground refuel panel 634. As another example, the fuel level in the sensor data, the quantity of fuel identified, or both may be sent to aircraft computer 636. Aircraft computer 636 may be, for example, a navigation computer. Aircraft computer 636 may use the sensor data to determine a range of the aircraft.

The illustration of sensor system 600 in FIG. 6 is an example of one implementation of sensor system 202 in FIG. 2 and is not meant to imply limitations to the manner in which other sensor system may be implemented. For example, one or more additional remote data concentrators may be present in sensor system 600 in addition to remote data concentrator 606. In other illustrative examples, a router may be implemented that does not perform processing of data as depicted with remote data concentrator 606. In still other illustrative examples, remote data concentrator 606 may be connected to sensor controller 604 through a network not shown in this example.

As another example, other types of information may be identified in fuel tank 602 in addition to the fuel level. For example, the temperature, a pressure, an amount of vapor, and other information may be received in the sensor data from the sensors. In still another illustrative example, sensors may be located in other locations in the aircraft other than fuel tank 602. These sensors also may generate sensor data that is sent to sensor controller 604. For example, sensors may be located inside the cabin of an aircraft, in association with an engine, or in other locations in the different illustrative examples.

Figure 7:
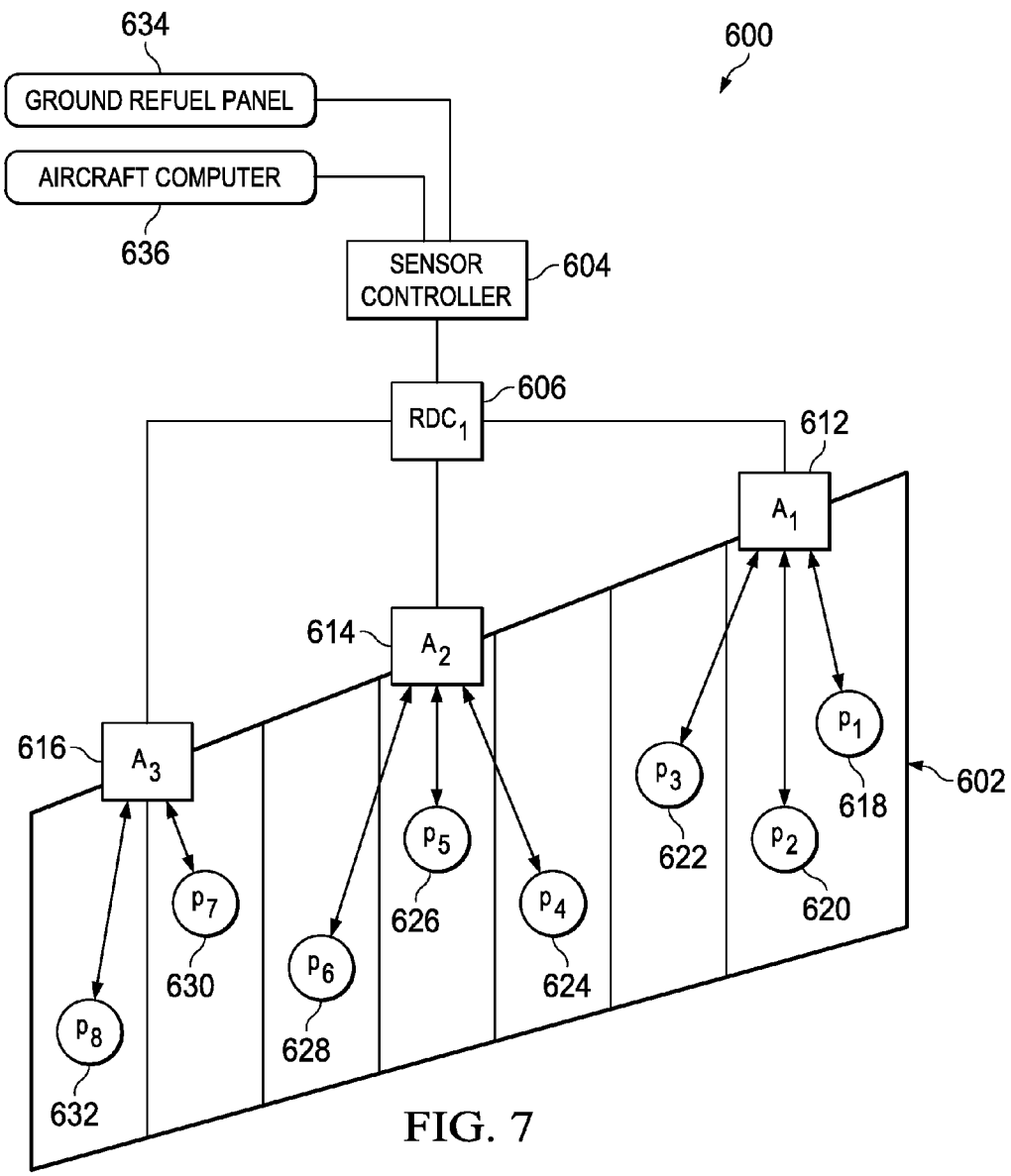
FIG. 7 is another illustration of a sensor system in accordance with an illustrative embodiment.

With reference now to FIG. 7, another illustration of a sensor system is depicted in accordance with an illustrative embodiment. In this illustrative example, another configuration for sensor system 600 is shown.

As depicted, reader $R_1$ 608 and reader $R_2$ 610 are not used in sensor system 600 as separate components. In the illustrative example, antenna 612, antenna 614, and antenna 616 are connected to remote data concentrator 606. The functionality for reader $R_1$ 608 and reader $R_2$ 610 is integrated in remote data concentrator 606. In other words, hardware such as transceiver units and other devices used to transmit radio frequency signals and receive radio frequency signals may be implemented within remote data concentrator 606. This type of implementation may reduce the number of devices installed in an aircraft.

Figure 8:
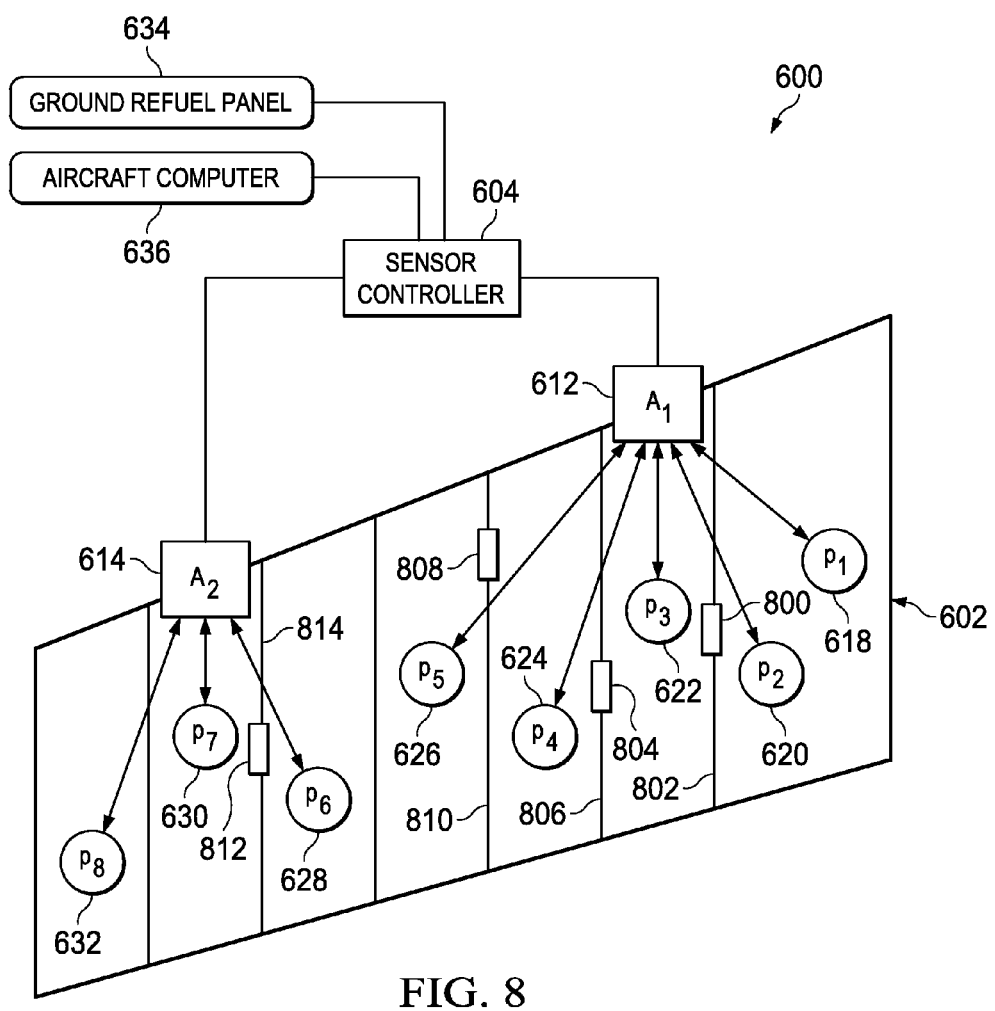
FIG. 8 is another illustration of a sensor system in accordance with an illustrative embodiment.

With reference now to FIG. 8, another illustration of a sensor system is depicted in accordance with an illustrative embodiment. FIG. 8 illustrates yet another illustration of sensor system 600. As depicted, radio frequency windows are formed in structures within fuel tank 602. For example, radio frequency window 800 is located in rib 802. Radio frequency window 804 is located in rib 806. Radio frequency window 808 is located in rib 810. Radio frequency window 812 is located in rib 814.

The materials used in these radio frequency windows may be any material that facilitates the passage of radio frequency signals through the windows. The materials selected for these radio frequency signals may be materials used in structures such as radomes. These materials may reduce the attenuation of radio frequency signals within fuel tank 602.

The materials may include materials selected from one of a polyurethane, polystyrene, polytetrafluoroethylene, a quartz/cyanate-ester composite material, a quartz/polybutadiene composite material, polyoxymethylene, nylon, a closed cell foam, a non-supported film adhesive, and other suitable materials.

In another illustrative example, a radio frequency window may be created using two passive antennas that are directly connected at a bulkhead. For example, an aperture may be formed in a metal rib. One antenna may be mounted to the forward bay with a first connector that is connected to another connector on the other side that is attached to the second antenna. These connectors may be, for example, a 50 ohm connector. The effect would be similar to having a physical aperture.

In this illustrative example, the use of radio frequency windows may reduce the number of components needed in sensor system 600. As depicted, antenna 616, reader $R_1$ 608, and reader $R_2$ 610 are not used in this configuration of sensor system 600. With this configuration, antenna 612 and antenna 614 provide a sufficient coverage for transmitting and receiving radio frequency signals within fuel tank 602.

Figure 9:
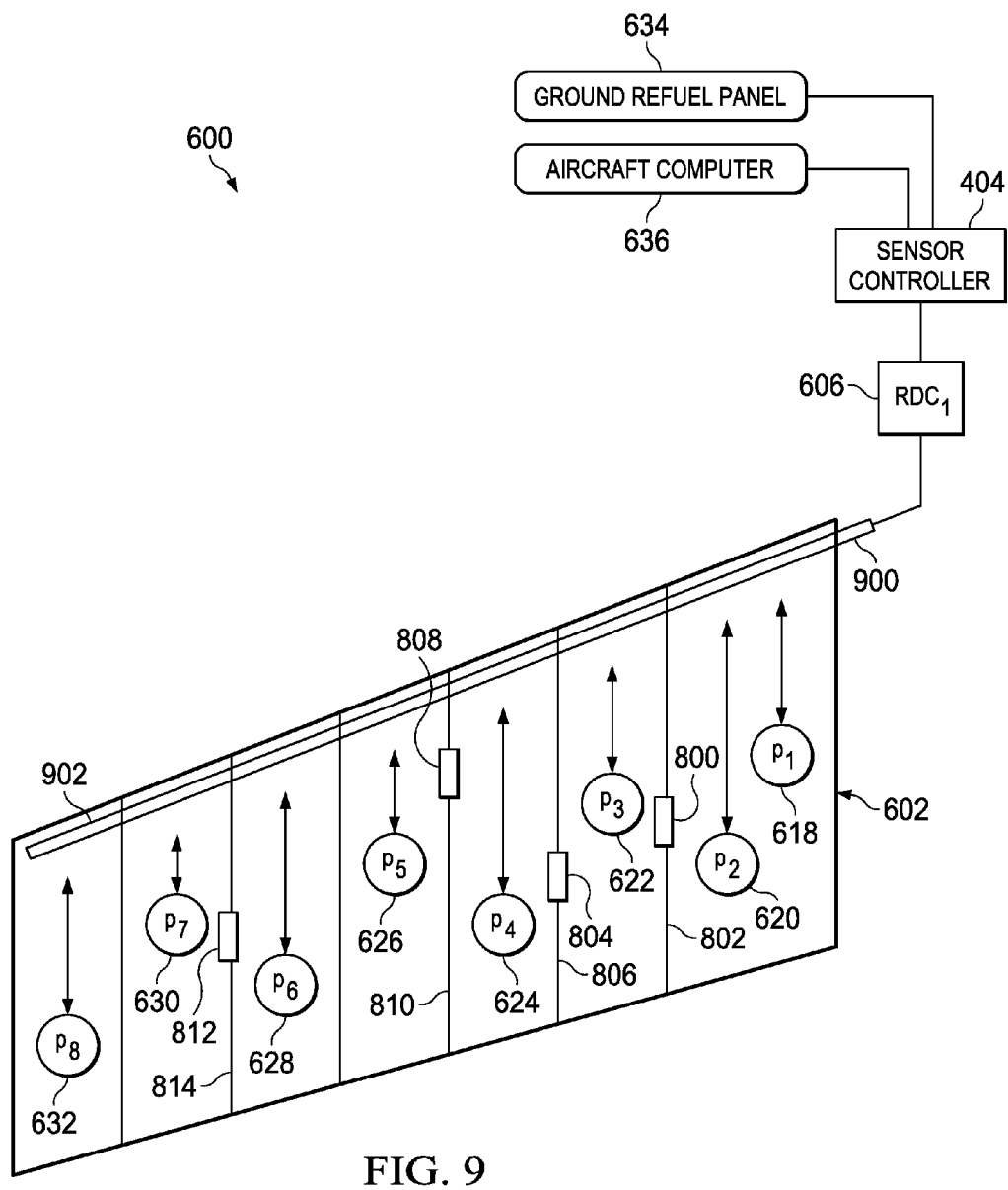
FIG. 9 is yet another illustration of a sensor system in accordance with an illustrative embodiment.

With reference now to FIG. 9, yet another illustration of a sensor system is depicted in accordance with an illustrative embodiment. FIG. 9 illustrates yet another illustration of another configuration for sensor system 600.

In this illustrative example, antenna 900 is used in place of antenna 612, antenna 614, and antenna 616. Antenna 900 is not a separate component like antenna 612, antenna 614, and antenna 616. Instead, antenna 900 is integrated within another structure. In this particular example, antenna 900 is integrated within spar 902 extending across fuel tank 602.

In particular, antenna 900 takes the form of a waveguide formed within spar 902. In the illustrative example, the waveguide may be a slotted waveguide. The slotted waveguide may aid in the propagation of the radio frequency signals through fuel tank 602. Additionally, when the waveguide takes the form of a slotted waveguide, the slotted waveguide may be formed as part of a structural component such as a stringer.

Slots in the stringer may be covered with radio frequency windows in the illustrative example. In this manner, the channel in the stringer may be isolated from fuel tank 602. Further, radio frequency signals with higher energy levels may be propagated through the stringer with the use of radio frequency windows.

As a result, the number of components that are manufactured and installed in fuel tank 602 are associated with fuel tank 602. In addition, with the use of antenna 900, reader $R_1$ 608 and reader $R_2$ 610 are not needed in this configuration for sensor system 600.

The illustrations of different configurations for sensor system 600 in FIGS. 6-9 are only meant as examples of some configurations that may be implemented for sensor system 600. These illustrations are not meant to limit the manner in which other illustrative embodiments may be implemented. For example, in other illustrative embodiments, radio frequency window 800, radio frequency window 804, radio frequency window 808, and radio frequency window 812 may not be needed in the configuration of sensor system 600 as depicted in FIG. 9.

In still other illustrative examples, other numbers of sensor units other than the eight sensor units illustrated for fuel tank 602 may be used. For example, one sensor unit, fifteen sensor units, twenty sensor units, or some other number of sensor units may be used.

As another example, sensor system 600 may be implemented in other locations in addition to or in place of fuel tank 602. For example, sensor system 600 also may be used within the passenger cabin of an aircraft, in association with an engine for the aircraft, and in other locations within the aircraft. For example, sensors may be present in the passenger cabin to generate data about parameters such as temperature, humidity, and other suitable parameters in the passenger cabin. The sensor data may be used by environment control system in aircraft 206 in FIG. 2. As another example, sensors may be present in different portions of the aircraft to detect other parameters such as pressure, strain, and other suitable parameters.

Figure 10:
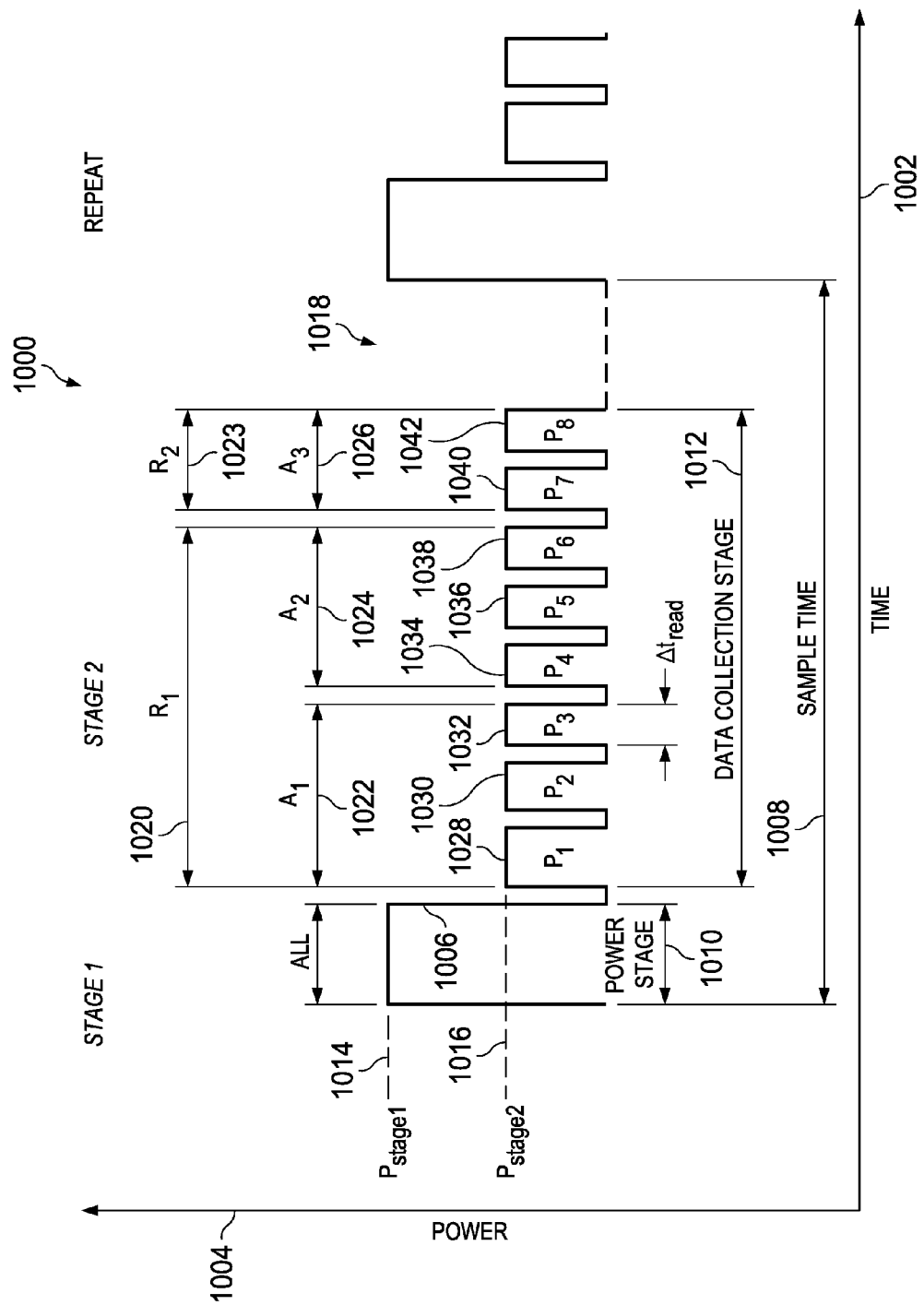
FIG. 10 is an illustration of a timing diagram in accordance with an illustrative embodiment.

With reference next to FIG. 10, an illustration of a timing diagram is depicted in accordance with an illustrative embodiment. In this depicted example, timing diagram 1000 illustrates timing for transmitting wireless signals and receiving wireless signals in a sensor system. As depicted, timing diagram 1000 illustrates the timing that may be used in sensor system 600 in FIG. 6.

As depicted, X axis 1002 represents time, while Y axis 1004 represents power of wireless signals transmitted within sensor system 202 in FIG. 2 and sensor system 600 in FIG. 6. In the illustrative example, line 1006 represents the power in radio frequency signals transmitted by the readers through the antennas to the sensor units in sensor system 600 in FIG. 6.

As can be seen, the power for the radio frequency transmissions in line 1006 has different levels. These different levels may correspond to different states of operation in sensor system 600 in FIG. 6. In particular, sensor system 600 in FIG. 6 may implement state machine 500 in FIG. 5 in the transmission of wireless signals.

As depicted, sample time 1008 represents a cycle in the collection of sensor data. Power stage 1010 and data collection stage 1012 are periods of time within sample time 1008.

During power stage 1010, line 1006 is at power level 1014. This power level is selected such that the energy in the wireless signals transmitted during power stage 1010 provides electrical energy to operate the sensor units in sensor system 600. The electrical energy provided to the sensor units may be used to perform different operations. For example, the operations may include at least one of making measurements, storing sensor data, or other suitable types of operations.

In the illustrative example, the duration of power stage 1010 varies depending on the particular sensor system and configuration of components such as antennas, sensor units, and other factors. The duration of power stage 1010 is selected to be efficient for sensor units to perform desired operations to generate sensor data and store data in the illustrative example. For example, the duration of power stage 1010 may be about 10 milliseconds when the power of the wireless signals is about 10 watts. In this example, the power of the wireless signals may be from about 1 mW to about 10 mW.

The selection of the time and power for signals may depend on the efficiency of the energy harvesting device used. Further, these parameters may vary depending on the location of sensor units, the configuration of the fuel tank or other structure, and other suitable factors.

After power stage 1010, data collection stage 1012 occurs. In data collection stage 1012, line 1006 has power level 1016. Power level 1016 is configured to cause the sensor units in sensor system 600 to send sensor data generated by the sensor units.

In these illustrative examples, information may be encoded in the wireless transmissions not shown in this figure. For example, the wireless transmissions may encode identifiers for different sensor units that cause both sensor units having the identifiers encoded to transmit sensor data.

In one illustrative example, a wireless power signal sent during power stage 1010 is received by all of the sensor units. In this example, during data collection stage 1012, pulses 1018 in line 1006 are used to send wireless data collections signals to the wireless sensors.

For example, pulses 1018 in time $R_1$ 1020 may be signals generated by reader $R_1$ 608 in FIG. 6. Pulses 1018 transmitted during time $A_1$ 1022 are transmitted by antenna 612 in this illustrative example. Pulses 1018 transmitted during time $A_2$ 1024 are transmitted by antenna 614 in FIG. 6. Pulses 1018 transmitted during time $A_3$ 1026 are transmitted by antenna 616 in FIG. 6 from signals generated by reader $R_2$ 610 in FIG. 6 during time $R_2$ 1023.

As depicted, pulses 1018 may be directed to particular sensor units based on information encoded in the wireless data collections signals that are transmitted. For example, pulse $P_1$ 1028 is directed toward sensor unit 618; pulse $P_2$ 1030 is directed towards sensor unit 620; pulse $P_3$ 1032 is directed towards sensor unit 622; pulse $P_4$ 1034 is directed towards sensor unit 624; pulse $P_5$ 1036 is directed towards sensor unit 626; pulse $P_6$ 1038 is directed towards sensor unit 628; pulse $P_7$ 1040 is directed towards sensor unit 630; pulse $P_8$ 1042 is directed towards sensor unit 632.

In this illustrative example, each pulse for a particular sensor unit may encode an identifier for that sensor unit. That identifier indicates that the pulse and any other information that may be encoded in the pulse is directed to the particular sensor unit identified in the pulse. The other information may include, for example, commands, instructions, data, and other suitable types of information.

In these illustrative examples, pulses 1018 may have a duration and power level similar to those used for reading radio frequency identifier tags. For example, a pulse may have a duration of about 10 milliseconds. The time for data collection stage 1012 is the time needed to read sensor data from all of the different sensor units in sensor system 600 in this example. This time may be identified by multiplying the number of sensor units by the pulse width for reading data from the sensor units. The time for data collection stage 1012 also may take into account other factors such as system latency.

Figure 11:
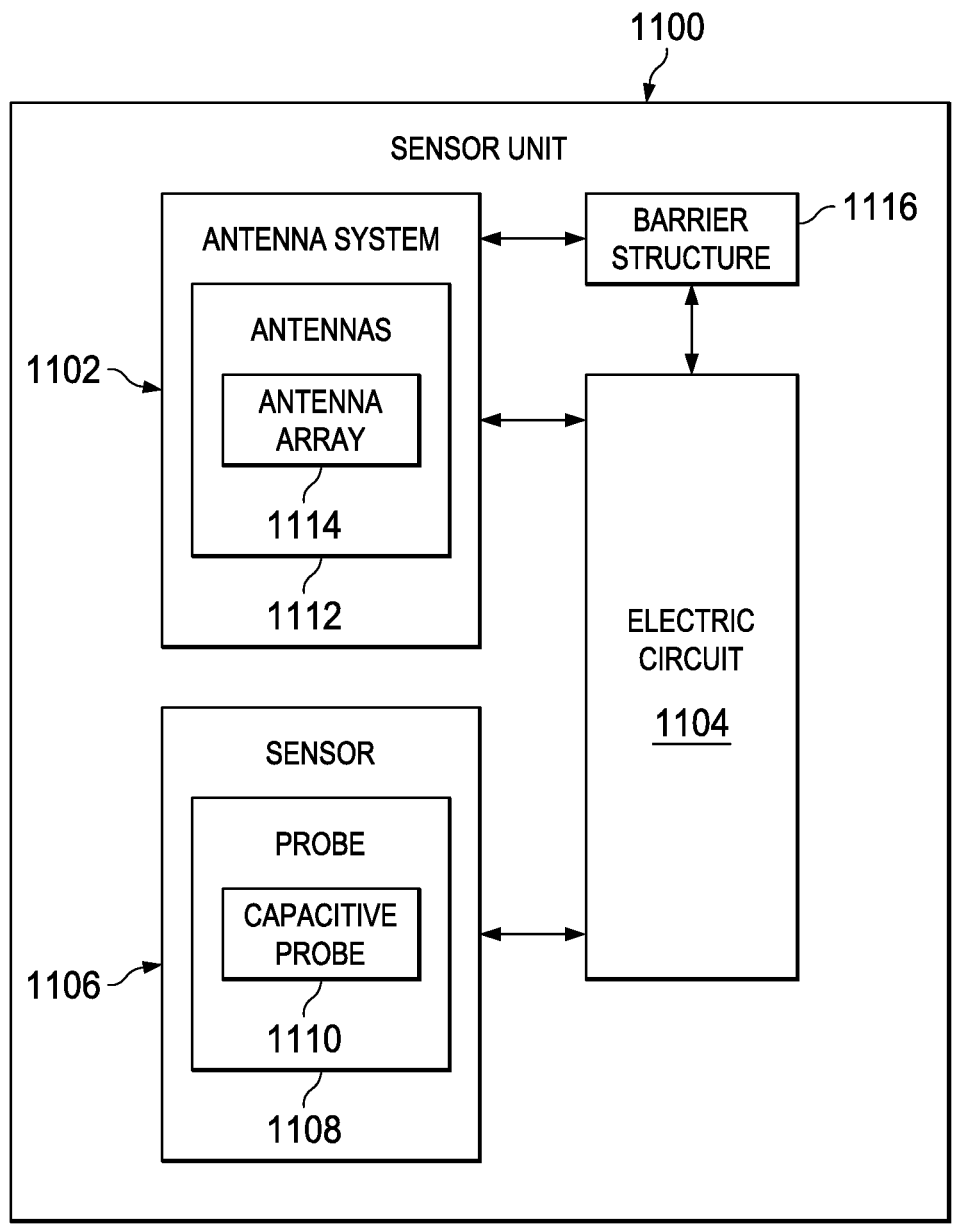
FIG. 11 is an illustration of a block diagram of a sensor unit in accordance with an illustrative embodiment.

With reference now to FIG. 11, an illustration of a block diagram of a sensor unit is depicted in accordance with an illustrative embodiment. In this illustrative example, sensor unit 1100 is another example of an implementation for a sensor unit in sensor units 212 in FIG. 2.

In the illustrative example, sensor unit 1100 includes a number of different components. As depicted, sensor unit 1100 includes antenna system 1102, electric circuit 1104, and sensor 1106.

Electric circuit 1104 is comprised of one or more different elements. Electric circuit 1104 may be implemented as an integrated circuit chip or multiple integrated circuit chips electrically connected to each other depending on the particular implementation.

Sensor 1106 may take various forms. In this illustrative example, sensor 1106 may be probe 1108. In other words, sensor 1106 may have an elongate shape such as a cylinder or some other suitable shape. In particular, probe 1108 may be capacitive probe 1110. Of course, sensor 1106 may take other forms other than capacitive probe 1110. For example, probe 1108 may be a temperature probe. In still other illustrative examples, other types of sensors may be used that may have other shapes for configurations.

Antenna system 1102 may take various forms. For example, antenna system 1102 may be a group of antennas 1112. This group of antennas 1112 may take the form of antenna array 1114.

In this illustrative example, antenna system 1102 is physically connected to sensor 1106. As used herein, a first component, antenna system 1102, "connected to" a second component, sensor 1106, means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As depicted, sensor 1106 may serve as a mounting structure for antenna system 1102. In still other illustrative examples, sensor 1106 may function as a ground or ground plane when sensor 1106 includes a metal material.

Further, antenna system 1102 is configured to exchange radio frequency signals in different environments. For example, the group of antennas 1112 may be configured to provide a desired level of exchange of radio frequency signals in both fuel and air. This configuration may take into account a change in level of fuel in a fuel tank. For example, fuel may sometimes cover a portion or all of the group of antennas 1112 when sensor unit 1100 is used in a fuel tank.

In some illustrative examples, different antennas in the group of antennas 1112 may be designed for different media. For example, the group of antennas 1112 may be a plurality of monopole antennas.

A first portion of the group of antennas 1112 may be configured to exchange radio frequency signals in the air. The second portion of the group of antennas 1112 may be configured to exchange wireless signals in a liquid such as fuel. The different antennas may be arranged such that at least some of the group of antennas 1112 are able to exchange radio frequency signals at a desired level. In these illustrative examples, the desired level for the radio frequency signals is, for example, at a level at which energy may be derived from radio frequency signals at a desired level or a level at which sensor data may be transmitted to a destination.

In yet another illustrative example, the group of antennas 1112 may include an antenna array formed on a planar substrate. This planar substrate may be connected to sensor 1106.

In yet another illustrative example, the group of antennas 1112 may be an antenna array formed on a flexible dielectric film. This flexible dielectric film is connected to the sensor. As a result, the antenna may conform to the shape of the sensor.

Additionally, sensor unit 1100 also may include barrier structure 1116. Barrier structure 1116 may provide protection from the environment around sensor unit 1100. Barrier structure 1116 may be configured to provide this protection to one or more components in sensor unit 1100.

For example, barrier structure 1116 may ensure that the group of antennas 1112 is exposed to a medium that has air instead of fuel. As another illustrative example, barrier structure 1116 also may provide protection for electric circuit 1104. For example, barrier structure 1116 may act as a housing for electric circuit 1104.

In the illustrative example, barrier structure 1116 may encapsulate one or more components and sensor unit 1100. Barrier structure 1116 may substantially prevent at least one of fuel, moisture, or other elements from reaching component and sensor unit 1100.

In other words, barrier structure 1116 may have an interior that is substantially sealed from allowing elements outside of barrier structure 1116 from entering the interior of barrier structure 1116.

In some illustrative examples, the interior includes a fluid such as air. In other illustrative examples, the fluid may be another gas such as nitrogen, helium, an inert gas, or some other suitable gas. In still other illustrative examples, the fluid may be a liquid within the interior of barrier structure 1116.

In other words, barrier structure 1116 may contain antennas 1112 in an environment that is configured for a desired level of performance for antennas 1112. For example, antennas 1112 may be maintained in a dry state by barrier structure 1116. Thus, barrier structure 1116 may be configured to provide a substantially dry environment for antennas 1112 in antenna system 1102.

Barrier structure 1116 is comprised of material that reduces the attenuation of radio frequency signals in this illustrative example. Barrier structure 1116 may be comprised of materials similar to those used in radomes. In fact, in some illustrative examples, barrier structure 1116 may be a radome.

Barrier structure 1116 may provide a layer of protection against environmental effects such as electromagnetic events. In other words, if electromagnetic events, such as an arc, occur within electric circuit 1104, barrier structure 1116 may prevent the arc from reaching other portions of the fuel tank.

Further, the use of barrier structure 1116 as a radome for antennas 1112 may keep fuel or other liquids at a selected distance from antennas 1112. In this manner, dielectric loading of the antenna may be reduced or eliminated such that the efficiency of antennas 1112 may remain at a desired level.

The illustration of sensor unit 1100 in FIG. 11 is not meant to imply physical or architectural limitations to the manner in which sensor units may be implemented. Other sensor units may include other components in addition to or in place of the ones illustrated for sensor unit 1100.

For example, one or more sensors in addition to sensor 1106 may be implemented in sensor unit 1100. As another illustrative example, sensor unit 1100 may include connectors to connect or mount sensor unit 1100 to different structures in a desired location.

In still another illustrative example, a combination of a multilayer printed wiring board (PWB) in a strip containing electrical components in electric circuit 1104 with a radio frequency flexible circuit for antennas 1112 may be used. This type of configuration may be wrapped around, and bonded to, a tube in probe 1108.

Figure 12:
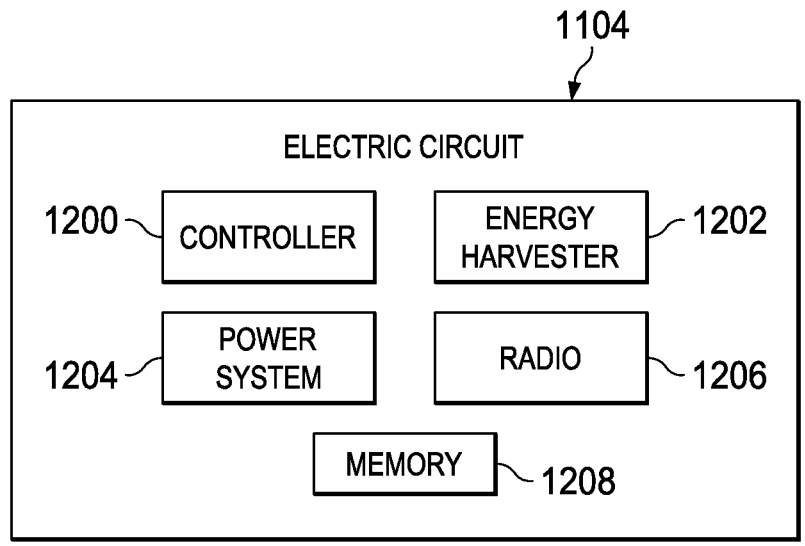
FIG. 12 is an illustration of a block diagram of an electric circuit in accordance with an illustrative embodiment.

Turning now to FIG. 12, an illustration of a block diagram of an electric circuit is depicted in accordance with an illustrative embodiment. In this illustration, an example of components in electric circuit 1104 is depicted. For example, electric circuit 1104 may include controller 1200, energy harvester 1202, power system 1204, radio 1206, memory 1208, and other suitable components.

As depicted, energy harvester 1202 is one or more devices configured to convert the energy in radio frequency signals received by antenna system 1102 into electrical energy. In this manner, sensor unit 1100 does not need to have a wired connection to a power source. Additionally, energy harvester 1202 may harvest energy from other sources in addition to or in place of radio frequency signals.

Controller 1200 is configured to control operation of the different components in sensor unit 1100 and may be, for example, a processor, a programmable logic array, an application specific integrated circuit, or some other suitable type of components. In some illustrative examples, radio 1206 includes a transmitter and a receiver and may be integrated as a transceiver rather than as separate components. Memory 1208 may store information including sensor data, program code, and other suitable types of information. Power system 1204 may provide for the storage of electrical energy. For example, power system 1204 may have an energy storage device such as a capacitor, battery, or some other suitable type of storage device. Additionally, power system 1204 also may include circuits to regulate and accumulate energy that is stored by power system 1204.

Figure 13:
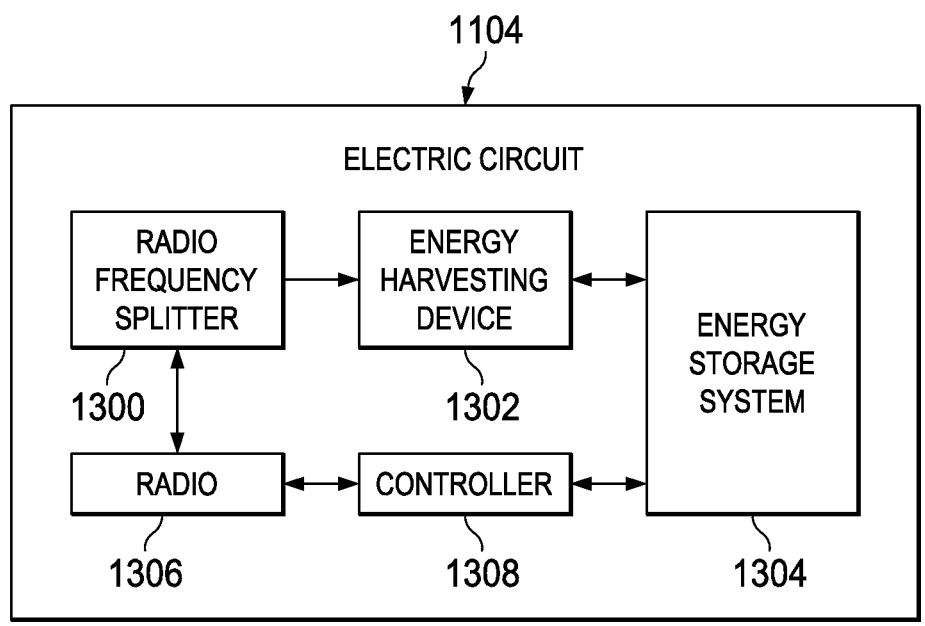
FIG. 13 is another illustration of a block diagram of an electric circuit in accordance with an illustrative embodiment.

With reference now to FIG. 13, another illustration of a block diagram of an electric circuit is depicted in accordance with an illustrative embodiment. In this illustration, another example of components that may be found in electric circuit 1104 is depicted. For example, electric circuit 1104 may include radio frequency splitter 1300, energy harvesting device 1302, energy storage system 1304, radio 1306, and controller 1308.

As depicted, radio frequency splitter 1300 is configured to be connected to antenna system 1102 in FIG. 11. Radio frequency splitter 1300 is configured to send wireless power signals to energy harvesting device 1302. Radio frequency splitter 1300 is also configured to send wireless data collection signals to radio 1306 for processing. In this illustrative example, the wireless data collection signal may include commands or other information that may be used by controller 1308 in performing measurement operations as well as other operations.

In this illustrative example, radio frequency splitter 1300 is configured to send a first portion of the radio frequency signal to radio 1306 and the second portion of the radio frequency signal to energy harvesting device 1302. The portion selected may be such that radio 1306 is able to demodulate the radio frequency signal. For example, the first portion may be about 20 percent and the second portion may be about 80 percent. The actual value selected may depend on particular components used for radio 1306 and energy harvesting device 1302.

As depicted, radio 1306 may convert sensor data or other information received from controller 1308 into a form for transmission over a wireless response signal. In particular, a transmitter in radio 1306 may generate a wireless response signal that is modulated to include the information.

In this illustrative example, a radio frequency identifier technique called "backscatter" may be implemented. With this type of technique, the need for circuit components such as low noise amplifiers, mixers, and other circuits may be reduced or eliminated within radio 1306. As a result, the operation of radio 1306 occurs with a reduced use of power through the elimination of circuit elements. As an example, radio 1306 may use power that is about at least 10 times lower than other "low power" radios. In this manner, radio 1306 in electric circuit 1104 is designed to meet policies such as safety policies, while other "low power" radios may not meet these types of policies.

Energy harvesting device 1302 is configured to generate energy from a wireless power signal received through radio frequency splitter 1300. This energy may be in the form of voltage sent to energy storage system 1304.

Energy storage system 1304 may store the energy until used to operate sensor unit 1100. Energy storage system 1304 may include an energy storage device and circuits used to accumulate, regulate, and store energy in the energy storage device. The energy storage device may be, for example, at least one of a capacitor, a battery, or some other suitable device.

Radio 1306 may include a transmitter and a receiver. Radio 1306 may receive a wireless data collection signal and identify information that may be encoded in the wireless data collection signal. This information is sent to controller 1308. Additionally, radio 1306 may receive information such as sensor data from controller 1308. This sensor data is encoded by radio 1306 for transmission as a wireless response signal.

Controller 1308 is connected to radio 1306, energy storage system 1304, and sensor 1106 in FIG. 11. In this illustrative example, controller 1308 is configured to control the operation of sensor unit 1100. For example, controller 1308 is configured to receive signals from sensor 1106 and generate sensor data from the signals. Controller 1308 is configured to send and receive information to a remote location using radio 1306.

Additionally, controller 1308 may also perform other operations such as controlling a sampling rate for signals received from sensor 1106, evaluate energy generated by energy harvesting device 1302 from radio frequency signals received by antennas 1112, send information about energy generated and other information as diagnostic information to a remote location, and other suitable operations.

As depicted, controller 1308 is also configured to send energy in the form of voltage to sensor 1106. Controller 1308 also sends the voltage to radio 1306.

As depicted, controller 1308 may receive an analog signal from sensor 1106 in FIG. 11. This analog signal may be a square wave or some other suitable type of signal. Controller 1308 converts this measurement into sensor data. For example, the analog signal may be converted into a height of fuel in a fuel tank.

The illustration of sensor system 202 as shown in block form in FIG. 2 and the different components in FIGS. 2-9 and FIGS. 11-13 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although the illustrative examples are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a house, a manufacturing facility, a building, a refinery, a chemical containment unit, fuel tank, passenger cabin, a wing, and other suitable platforms. In other words, sensor system 202 may be placed in various locations in these different platforms.

As yet another illustrative example, other wireless signals other than wireless power signals 216, wireless data collection signals 218, and wireless response signals 220 as shown in block form in FIG. 2 may be present. For example, other types of wireless signals may encode information such as commands, data, or other information to configure how sensor units 212 in FIG. 2 operate.

As another illustrative example, energy harvesting device 1302 may harvest energy from other sources other than radio frequency signals. For example, energy harvesting device 1302 may include, or may be physically associated with, components to harvest energy from at least one of a temperature gradient, vibrations, movement, or other suitable sources of energy in the environment around sensor unit 1100. For example, a thermal electric generator may be used to drive energy from a temperature gradient. As another example, an electric crystal fiber may be used to derive energy from vibrations.

Also in this illustrative example, sensor unit 1100 and the components in FIGS. 11-13 may be configured to meet a policy. In particular, components such as at least one of sensor unit 1100, antenna system 1102, energy harvesting device 1302, controller 1308, or other components are configured to meet a safety policy.

Figure 14:
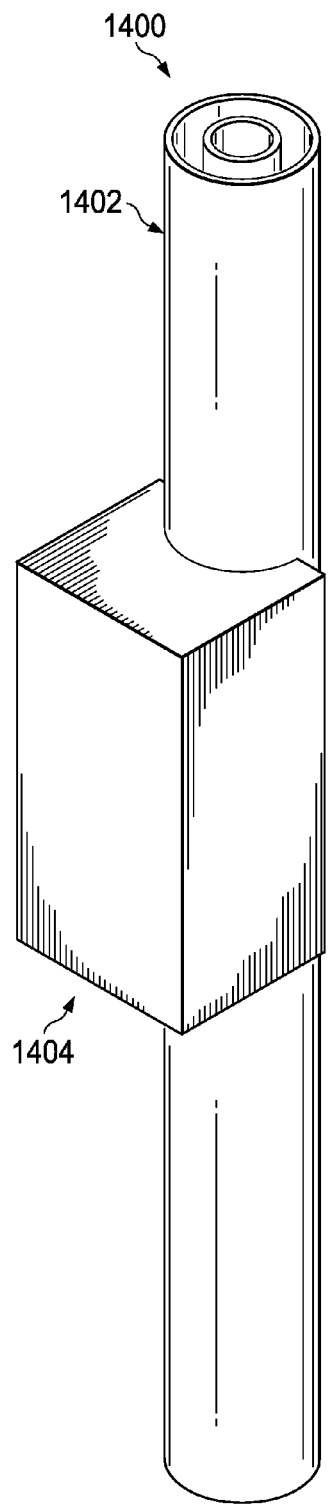
FIG. 14 is an illustration of a sensor unit in accordance with an illustrative embodiment.

With reference now to FIG. 14, an illustration of a sensor unit is depicted in accordance with an illustrative embodiment. In this illustrative example, sensor unit 1400 is an example of a physical implementation for sensor unit 1100 shown in block form in FIG. 11.

As depicted, sensor unit 1400 includes capacitive probe 1402 and barrier structure 1404. Other components such as an antenna and an electric circuit are present within barrier structure 1404, but not shown in this view. As depicted, barrier structure 1404 takes the form of a housing in this particular example. The housing may be comprised of various materials such as plastic, polycarbonate, and other materials suitable for use in a fuel tank. Additionally, the selection of the material for barrier structure 1404 is one that reduces the attenuation of radio frequency signals.

Barrier structure 1404 may isolate the components within barrier structure 1404 from the environment around sensor unit 1400. For example, if sensor unit 1400 is partially or fully immersed in fuel, barrier structure 1404 may prevent fuel from entering into the interior where the different components are located.

Figure 15:
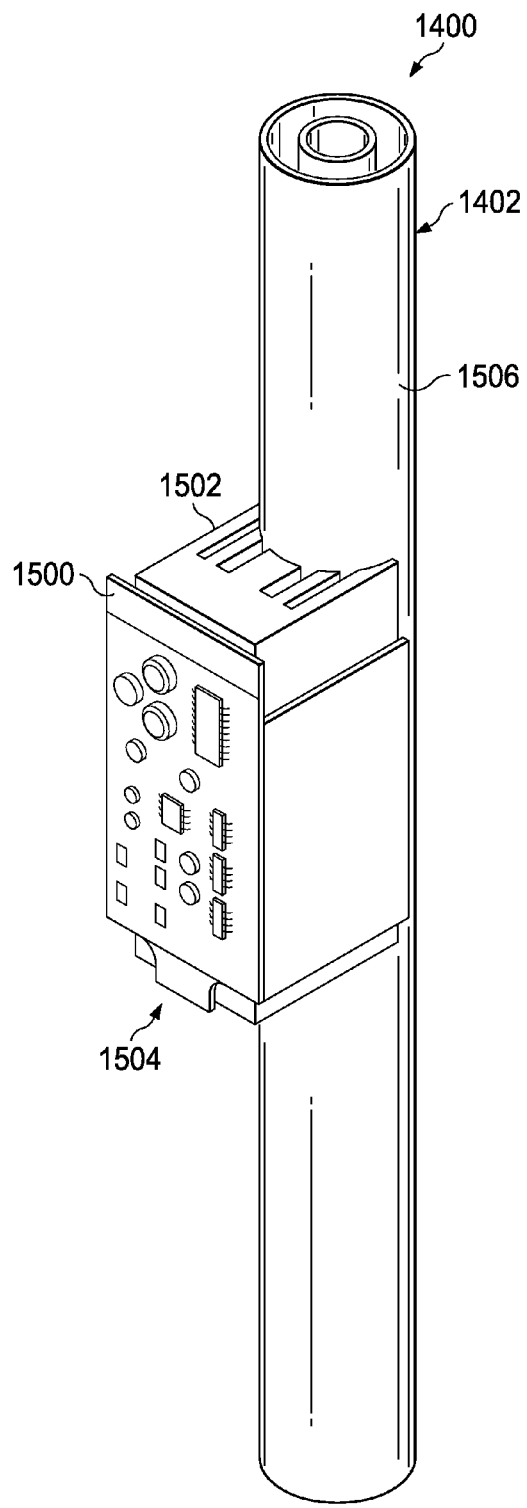
FIG. 15 is another illustration of a sensor unit in accordance with an illustrative embodiment.

Turning now to FIG. 15, another illustration of a sensor unit is depicted in accordance with an illustrative embodiment. In this example, barrier structure 1404 in FIG. 14 has been removed. In this view, planar circuit board 1500 is shown connected to capacitive probe 1402 by connector 1502. Connector 1502 may be comprised of various materials, such as, for example, plastic, polycarbonate, aluminum, or any other suitable material for use in a fuel tank.

As depicted, electric circuit 1504 is formed from different integrated circuits and trace lines on planar circuit board 1500. Additionally, antenna 1506 is located on planar circuit board 1500 in this example.

Figure 16:
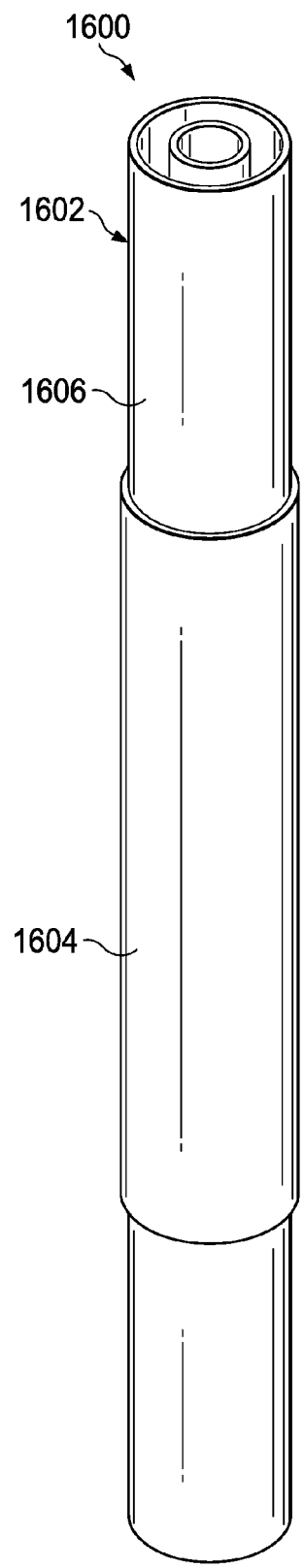
FIG. 16 is another illustration of a sensor unit in accordance with an illustrative embodiment.

With reference now to FIG. 16, another illustration of a sensor unit is depicted in accordance with an illustrative embodiment. In this illustrative example, sensor unit 1600 is an example of an implementation for sensor unit 1100 shown in block form in FIG. 11.

In this illustrative example, sensor unit 1600 includes capacitive probe 1602 and barrier structure 1604. Barrier structure 1604 is connected to capacitive probe 1602.

As can be seen, barrier structure 1604 has a cylindrical shape around surface 1606 of capacitive probe 1602. In other words, barrier structure 1604 conforms to surface 1606 of capacitive probe 1602. Additionally, barrier structure 1604 may be comprised of a material selected for use in a fuel tank and reduces attenuation of radio frequency signals.

Figure 17:
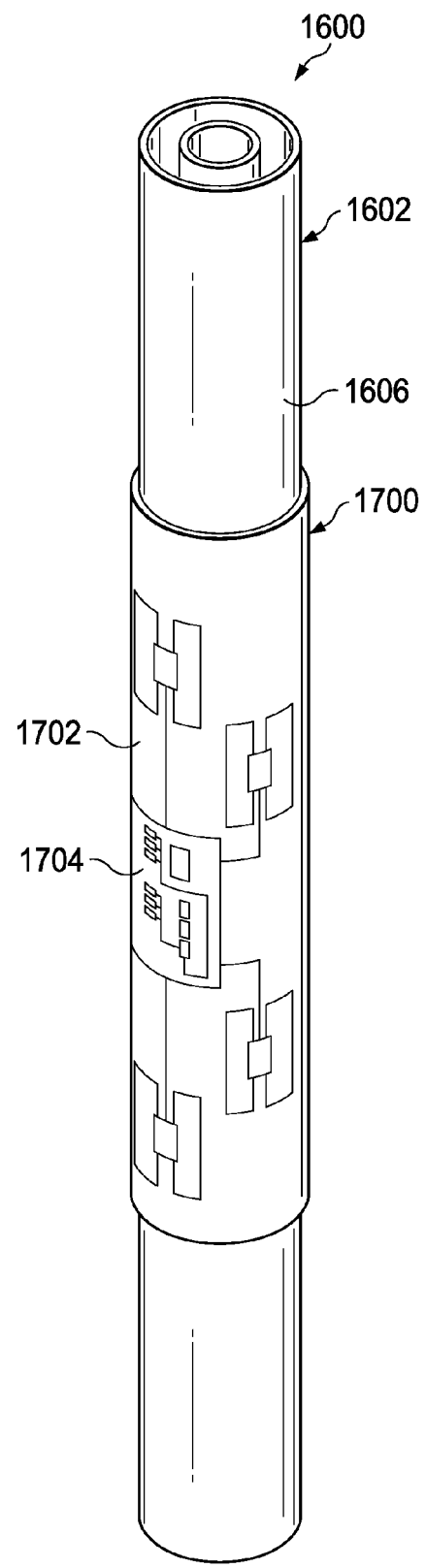
FIG. 17 is yet another illustration of a sensor unit in accordance with an illustrative embodiment.

With reference now to FIG. 17, yet another illustration of a sensor unit is depicted in accordance with an illustrative embodiment. In this example, sensor unit 1600 is shown without barrier structure 1604. As can be seen in this illustrative example, flexible dielectric film 1700 has a shape that conforms to surface 1606 of capacitive probe 1602. In this example, flexible dielectric film 1700 is connected to surface 1606 of capacitive probe 1602.

Antenna array 1702 is formed on flexible dielectric film 1700. Antenna array 1702 may be a flexible radio frequency circuit material with copper lines or other metal lines. These materials may be laminated to form a multilayer flexible antenna element. One or more of these multilayer flexible antenna elements may be used. As depicted, plurality of multilayer flexible antenna elements form antenna array 1702.

Additionally, electric circuit 1704 is also connected to flexible dielectric film 1700. Electric circuit 1704 takes the form of an integrated circuit chip in this illustrative example. An integrated circuit chip may have a shape configured to conform to surface 1606 of capacitive probe 1602. In other illustrative examples, the circuit may be formed on a flexible material.

Figure 18:
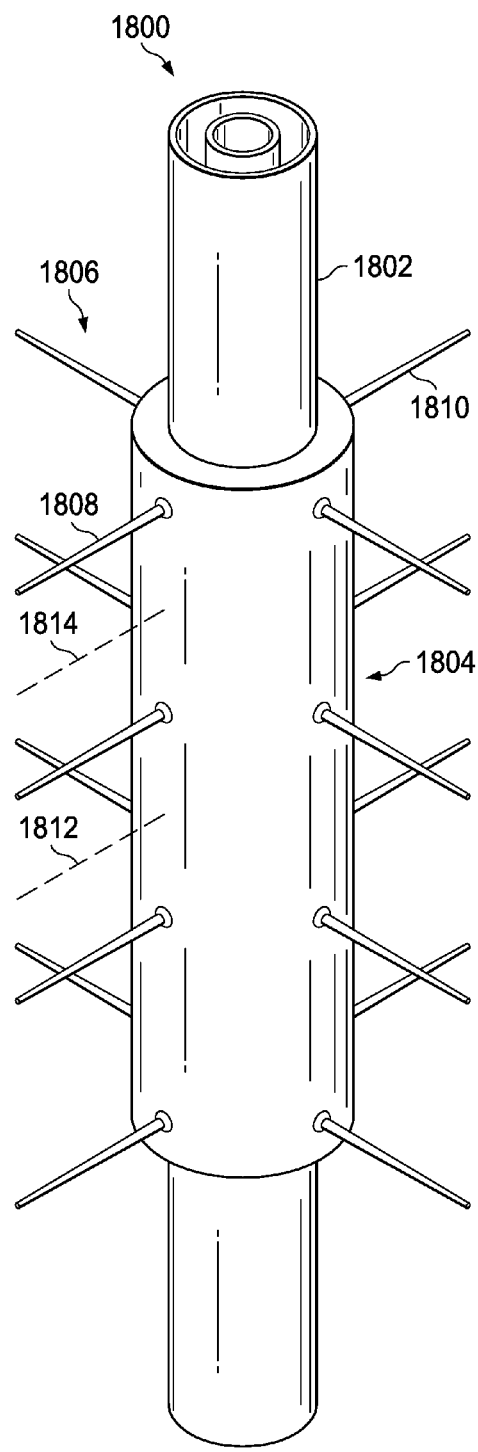
FIG. 18 is yet another illustration of a sensor unit in accordance with an illustrative embodiment.

With reference now to FIG. 18, an illustration of a sensor unit is depicted in accordance with an illustrative embodiment. In this illustrative example, sensor unit 1800 is an example of an implementation for sensor unit 1100 shown in block form in FIG. 11.

In this illustrative example, sensor unit 1800 comprises capacitive probe 1802, barrier structure 1804, and antenna array 1806. Barrier structure 1804 is connected to capacitive probe 1802. Barrier structure 1804 may contain components such as an electric circuit within the interior of barrier structure 1804.

In this illustrative example, antenna array 1806 is not covered or located within barrier structure 1804. A group of antennas within antenna array 1806 are configured to send and receive radio frequency signals in different mediums.

For example, antenna 1808 in antenna array 1806 may be configured to send and receive radio frequency signals in air. Antenna 1810 in antenna array 1806 may be configured to send and receive radio frequency signals in fuel.

Thus, if fuel level 1812 is present, then antenna 1808 may send and receive radio frequency signals at a desired level while antenna 1810 may not send and receive radio frequency signals at a desired level. If fuel level 1814 is present, antenna 1808 may not send and receive radio frequency signals at a desired level while antenna 1810 sends and receives radio frequency signals at a desired level.

In other words, each antenna in antenna array 1806 may be configured to send and receive radio frequency signals in a selected medium such as air or fuel. As a result, as the fuel level changes, at least a portion of the group of antennas in antenna array 1806 may send and receive radio frequency signals at a desired level, even though the fuel level may change.

Figure 19:
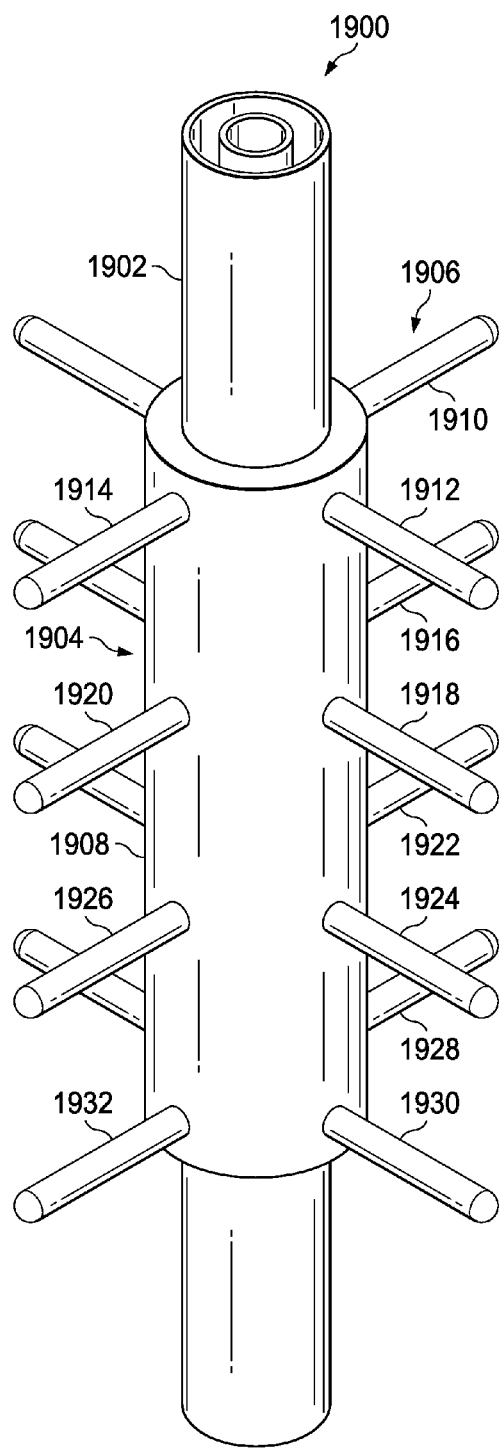
FIG. 19 is still another illustration of a sensor unit in accordance with an illustrative embodiment.

With reference now to FIG. 19, an illustration of a sensor unit is depicted in accordance with an illustrative embodiment. In this illustrative example, sensor unit 1900 is an example of an implementation for sensor unit 1100 shown in block form in FIG. 11.

In this illustrative example, sensor unit 1900 comprises capacitive probe 1902, barrier structure 1904, and antenna array 1906. Barrier structure 1904 is connected to capacitive probe 1902. Barrier structure 1904 may contain components such as an electric circuit within the interior of barrier structure 1904.

In this example, the group of antennas in antenna array 1906 is not shown because the group of antennas in antenna array 1906 is covered by barrier structure 1904. The group of antennas in antenna array 1906 may be configured to send and receive radio frequency signals in air. Barrier structure 1904 is configured to prevent fuel from contacting the group of antennas in antenna array 1906. In the illustrative example, barrier structure 1904 may reduce dielectric loading of the antenna. Dielectric loading on the antenna may cause a shift in resonant frequency, which reduces the performance of the antenna.

In this illustrative example, barrier structure 1904 may be comprised of housing 1908, element 1910, element 1912, element 1914, element 1916, element 1918, element 1920, element 1922, element 1924, element 1926, element 1928, element 1928, element 1930, and element 1932. These elements covering the group of antennas may be radomes in this illustrative example.

The materials used in barrier structure 1904 may be all of the same type of material or different types of materials. For example, housing 1908 and the different elements may all be comprised of a material suitable for use in a fuel tank. The material selected for the different elements may be ones that reduce attenuation of radio frequency signals while the material for housing 1908 does not have such a requirement.

The different components shown in FIGS. 1 and 14-19 may be combined with components in FIGS. 2-9 and 11-13, used with components in FIGS. 2-9 and 11-13, or a combination of the two. Additionally, some of the components in FIGS. 1 and 14-19 may be illustrative examples of how components shown in block form in FIGS. 2-9 and 11-13 can be implemented as physical structures.

Figure 20:
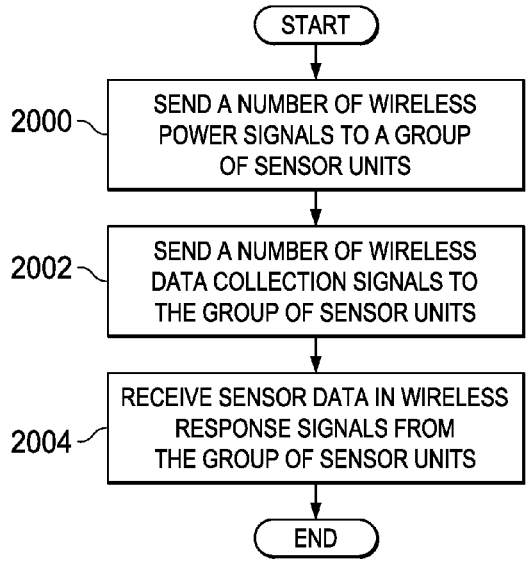
FIG. 20 is an illustration of a flowchart of a process for generating sensor data in accordance with an illustrative embodiment.

Turning now to FIG. 20, an illustration of a flowchart of a process for generating sensor data is depicted in accordance with an illustrative embodiment. The process illustrated in FIG. 20 may be implemented in sensor system 202 in FIG. 2.

The process begins by sending a number of wireless power signals to a group of sensor units (operation 2000). After the number of wireless power signals have been sent to the group of sensor units, a number of wireless data collection signals are sent to the group of sensor units (operation 2002).

Next, sensor data in wireless response signals is received from the group of sensor units (operation 2004). The process terminates thereafter.

In the illustrative examples, these operations may be repeated any number of times to obtain sensor data from the group of sensor units. These operations send wireless signals at different power levels. These power levels may be similar to those illustrated in timing diagram 1000 in FIG. 10.

Figure 21:
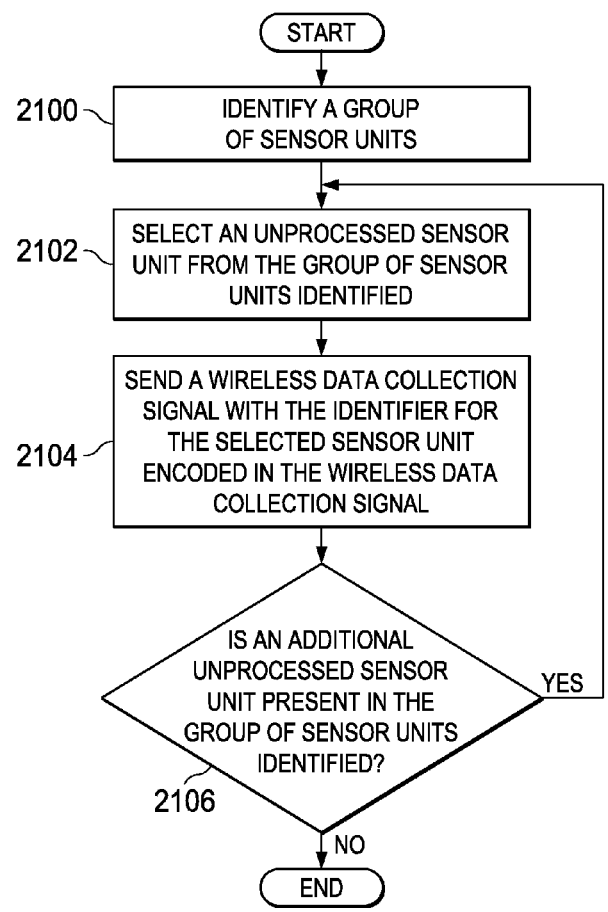
FIG. 21 is an illustration of a flowchart of a process for sending wireless data collection signals in accordance with an illustrative embodiment.

With reference now to FIG. 21, an illustration of a flowchart of a process for sending wireless data collection signals is depicted in accordance with an illustrative embodiment. The operations illustrated in FIG. 21 are examples of operations that may be used to implement operation 2002 in FIG. 20.

The process begins by identifying a group of sensor units (operation 2100). The sensor units are ones for which data collection of sensor data is desired. These sensors may be identified from a data structure such as a database, a link, a list, a table, or some other suitable type of data structure. The information in the data structure may be, for example, identifiers for the group of sensor units.

The process then selects an unprocessed sensor unit from the group of sensor units identified (operation 2102). The process then sends a wireless data collection signal with the identifier for the selected sensor unit encoded in the wireless data collection signal (operation 2104). A determination is made as to whether an additional unprocessed sensor unit is present in the group of sensor units identified (operation 2106).

If an additional unprocessed sensor unit is present, the process returns to operation 2102. Otherwise, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in the flowchart in FIG. 21, the process may include an operation to wait for a wireless response signal to be received from the sensor unit before proceeding to select another sensor unit for processing. As another example, the wireless data collection signal may be a broadcast signal and may not include identifiers for the wireless sensor units. In this implementation, the wireless sensor units may all transmit sensor data when receiving this broadcast signal.

Figure 22:
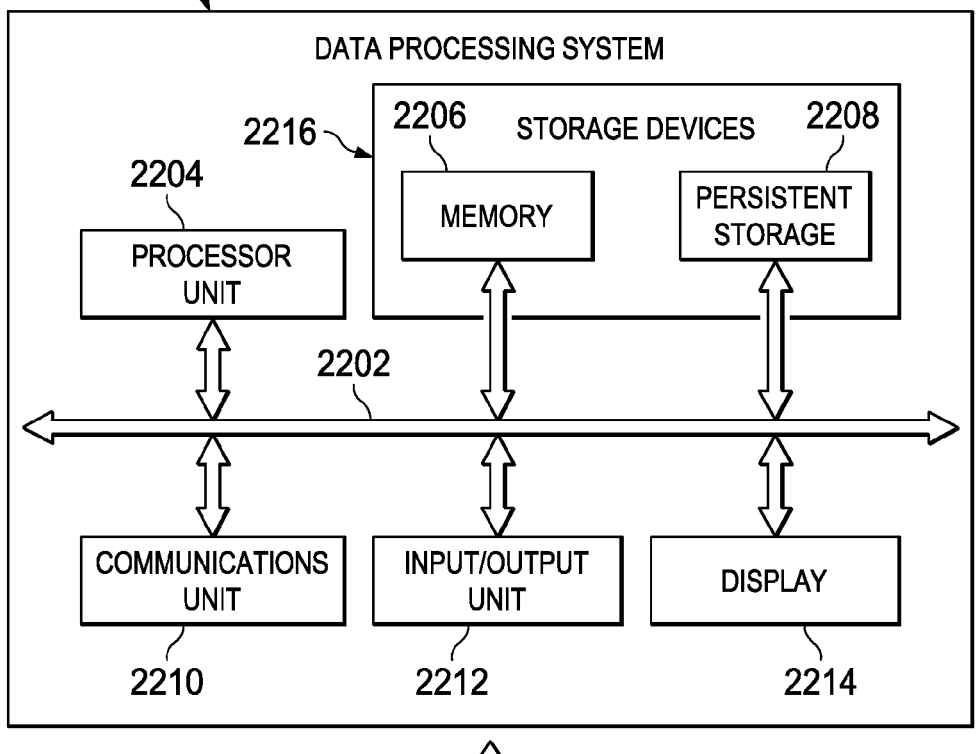
FIG. 22 is an illustration of a block diagram of a data processing system in accordance with an illustrative embodiment.
Figure 22:
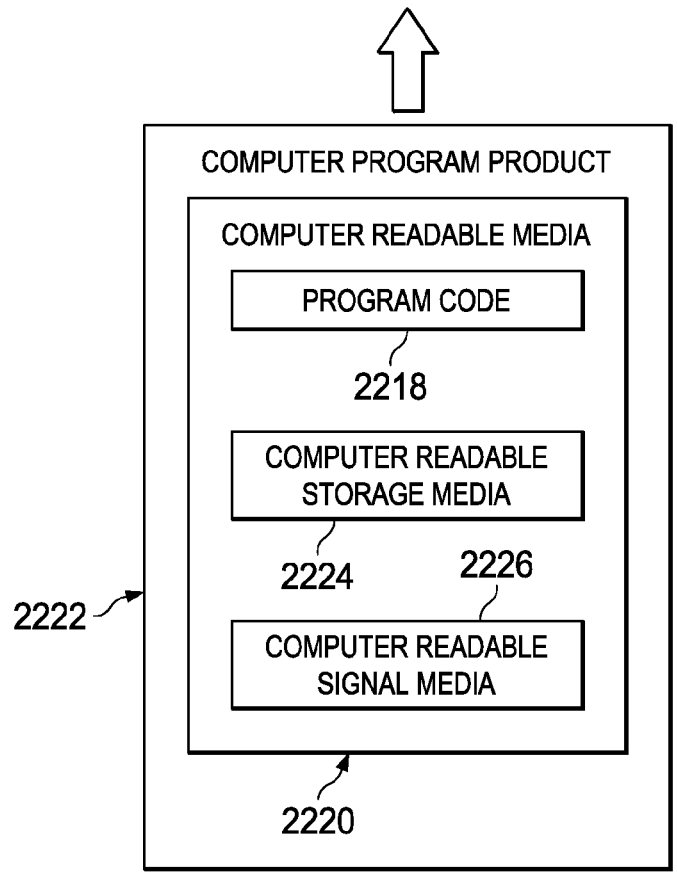

Turning now to FIG. 22, an illustration of a block diagram of a data processing system is depicted in accordance with an illustrative embodiment. Data processing system 2200 may be used to implement sensor controller 208 in FIG. 2. In this illustrative example, data processing system 2200 includes communications framework 2202, which provides communications between processor unit 2204, memory 2206, persistent storage 2208, communications unit 2210, input/output (I/O) unit 2212, and display 2214. In this example, communication framework may take the form of a bus system.

Processor unit 2204 serves to execute instructions for software that may be loaded into memory 2206. Processor unit 2204 may be a number of processors, a multi-processor core, or some other type of processor, depending on the particular implementation.

Memory 2206 and persistent storage 2208 are examples of storage devices 2216. A storage device is any piece of hardware that is capable of storing information, such as, for example, without limitation, data, program code in functional form, and/or other suitable information either on a temporary basis and/or a permanent basis. Storage devices 2216 may also be referred to as computer readable storage devices in these illustrative examples. Memory 2206, in these examples, may be, for example, a random access memory or any other suitable volatile or non-volatile storage device. Persistent storage 2208 may take various forms, depending on the particular implementation.

For example, persistent storage 2208 may contain one or more components or devices. For example, persistent storage 2208 may be a hard drive, a flash memory, a rewritable optical disk, a rewritable magnetic tape, or some combination of the above. The media used by persistent storage 2208 also may be removable. For example, a removable hard drive may be used for persistent storage 2208.

Communications unit 2210, in these illustrative examples, provides for communications with other data processing systems or devices. In these illustrative examples, communications unit 2210 is a network interface card.

Input/output unit 2212 allows for input and output of data with other devices that may be connected to data processing system 2200. For example, input/output unit 2212 may provide a connection for user input through a keyboard, a mouse, and/or some other suitable input device. Further, input/output unit 2212 may send output to a printer. Display 2214 provides a mechanism to display information to a user.

Instructions for the operating system, applications, and/or programs may be located in storage devices 2216, which are in communication with processor unit 2204 through communications framework 2202. The processes of the different embodiments may be performed by processor unit 2204 using computer-implemented instructions, which may be located in a memory, such as memory 2206.

These instructions are referred to as program code, computer usable program code, or computer readable program code that may be read and executed by a processor in processor unit 2204. The program code in the different embodiments may be embodied on different physical or computer readable storage media, such as memory 2206 or persistent storage 2208.

Program code 2218 is located in a functional form on computer readable media 2220 that is selectively removable and may be loaded onto or transferred to data processing system 2200 for execution by processor unit 2204. Program code 2218 and computer readable media 2220 form computer program product 2222 in these illustrative examples. In one example, computer readable media 2220 may be computer readable storage media 2224 or computer readable signal media 2226.

In these illustrative examples, computer readable storage media 2224 is a physical or tangible storage device used to store program code 2218 rather than a medium that propagates or transmits program code 2218.

Alternatively, program code 2218 may be transferred to data processing system 2200 using computer readable signal media 2226. Computer readable signal media 2226 may be, for example, a propagated data signal containing program code 2218. For example, computer readable signal media 2226 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2200 are not meant to provide architectural limitations to the manner in which different embodiments may be implemented. The different illustrative embodiments may be implemented in a data processing system including components in addition to and/or in place of those illustrated for data processing system 2200. Other components shown in FIG. 22 can be varied from the illustrative examples shown. The different embodiments may be implemented using any hardware device or system capable of running program code 2218.

Figure 23:
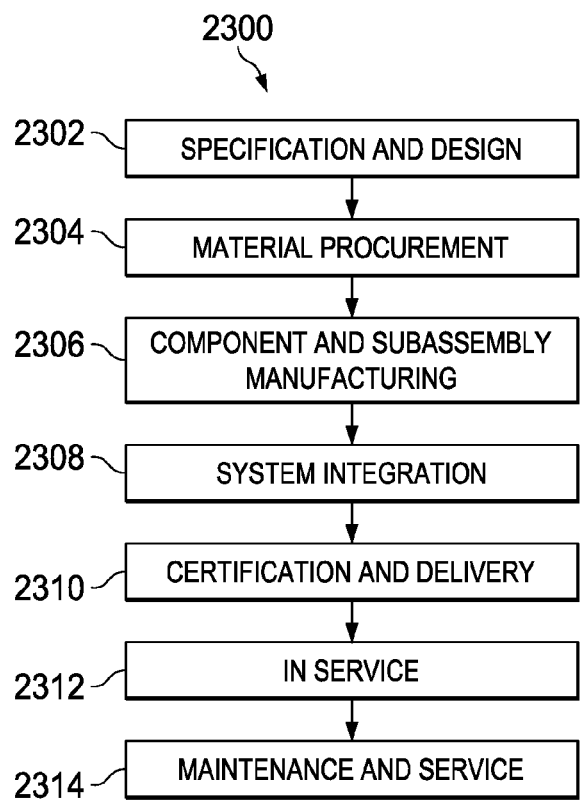
FIG. 23 is an illustration of an aircraft manufacturing and service method in the form of a block diagram in accordance with an illustrative embodiment.
Figure 24:
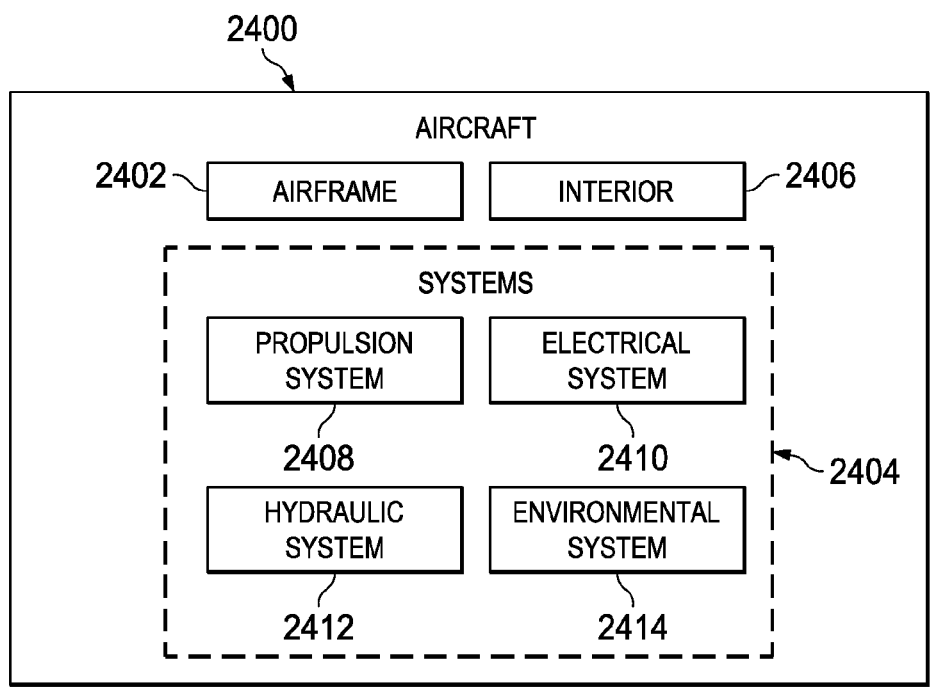
FIG. 24 is an illustration of an aircraft in the form of a block diagram in which an illustrative embodiment may be implemented.

Illustrative embodiments of the disclosure may be described in the context of aircraft manufacturing and service method 2300 as shown in FIG. 23 and aircraft 2400 as shown in FIG. 24. Turning first to FIG. 23, an illustration of an aircraft manufacturing and service method is depicted in accordance with an illustrative embodiment. During pre-production, aircraft manufacturing and service method 2300 may include specification and design 2302 of aircraft 2400 in FIG. 24 and material procurement 2304.

During production, component and subassembly manufacturing 2306 and system integration 2308 of aircraft 2400 in FIG. 24 takes place. Thereafter, aircraft 2400 in FIG. 24 may go through certification and delivery 2310 in order to be placed in service 2312. While in service 2312 by a customer, aircraft 2400 in FIG. 24 is scheduled for routine maintenance and service 2314, which may include modification, reconfiguration, refurbishment, and other maintenance or service.

Each of the processes of aircraft manufacturing and service method 2300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 24, an illustration of an aircraft is depicted in which an illustrative embodiment may be implemented. In this example, aircraft 2400 is produced by aircraft manufacturing and service method 2300 in FIG. 23 and may include airframe 2402 with plurality of systems 2404 and interior 2406. Examples of systems 2404 include one or more of propulsion system 2408, electrical system 2410, hydraulic system 2412, and environmental system 2414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2300 in FIG. 23. For example, the different components in sensor system 202 may be manufactured and produced during component and subassembly manufacturing 2306 in FIG. 23.

As yet another example, one or more apparatus embodiments, method embodiments, or a combination thereof may be utilized during system integration 2308, in service 2312, during maintenance and service 2314, as well as other stages in FIG. 23.

For example, sensor system 202 may be used to generate sensor data while aircraft 2400 is in service 2312. As another illustrative example, sensor system 202 may be implemented in aircraft 2400 during maintenance and service 2314. For example, sensor system 202 may be added to aircraft 2400 during refurbishment, upgrades, and other operations that may be performed. In some illustrative examples, some components in sensor system 202 may already be present while others may be added when sensor system 202 is implemented during maintenance and service 2314.

The use of a number of the different illustrative embodiments may substantially expedite the assembly of and/or reduce the cost of aircraft 2400. In the illustrative examples, a reduction in time and cost may occur through the reduced need for wires, harnesses, and other components used in transmitting signals over a wired medium. Further, the number of openings formed for wires and the inspection and maintenance and inspection of seals for those openings also may be reduced when using sensor system 202 in aircraft 2400.

Thus, the illustrative embodiments provide a method and apparatus for providing sensor data in a manner that provides information desired for operating an aircraft. The illustrative embodiments provide an ability to reduce the number of components used in a sensor system. As a result, the weight, cost, and time needed to install a sensor system may be reduced using one or more illustrative embodiments.

Thus, one or more illustrative embodiments may be implemented to reduce the need for wires in an aircraft. In the illustrative examples, the architecture for sensor system 202 may be used in areas in which the routing of wires may be more difficult than desired as well as in areas in which the use of wires is undesirable. With an illustrative embodiment, the formation of goals for wires and the entry of wires into areas such as a fuel tank may be reduced or eliminated.

As a result, issues with respect to the routing wires, the standoff wires and other components from structures to reduce effects, such as arcing or discharge, from undesired electoral magnetic events, such as lightning or static electricity may be reduced or unnecessary.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft fuel sensor system comprising:
   a group of sensor units located in a fuel tank of an aircraft;
   a wireless system configured to send a number of wireless power signals and a number of wireless data collection signals to the group of sensor units under a control of a sensor controller and receive sensor data in a number of wireless response signals sent from the group of sensor units;
   the sensor controller, wherein the sensor controller is configured to cause the wireless system to send the number of wireless power signals to the group of sensor units; cause the wireless system to send the number of wireless data collection signals to the group of sensor units after the number of wireless power signals have been sent to the group of sensor units; and receive the sensor data transmitted wirelessly in the number of wireless response signals from the wireless system; and
   a radio frequency window formed in a structure of the fuel tank, wherein the radio frequency window facilitates the passage at least one of the wireless response signals, the wireless power signals, or the wireless data collection signals through the structure, and wherein the radio frequency window is formed of a physical aperture in the structure and a material placed in the physical aperture, wherein the material facilitates the passage of at least one of the wireless response signals, the wireless power signals, or the wireless data collection signals through the radio frequency window.

2. The aircraft fuel sensor system of claim 1, wherein a sensor unit in the group of sensor units comprises:
   a sensor;
   an antenna system physically connected to the sensor, wherein the antenna system is configured to send and receive wireless signals;
   an energy harvesting device configured to derive energy from the wireless signals received; and
   a controller configured to control the sensor to make a measurement, save the measurement as the sensor data, and send the sensor data in the wireless signals.

3. The aircraft fuel sensor system of claim 1, wherein the material is selected from one of a polyurethane, polystyrene, polytetrafluoroethylene, a quartz/cyanate-ester composite material, a quartz/polybutadiene composite material, polyoxymethylene, nylon, a closed cell foam, a non-supported film adhesive.

4. A method for generating sensor data, the method comprising:
   sending a number of wireless power signals to a group of sensor units;
   sending a number of wireless data collection signals to the group of sensor units after the number of wireless power signals have been sent to the group of sensor units;
   receiving the sensor data in a number of wireless response signals from the group of sensor units; and
   facilitating the passage of at least one of the number of wireless response signals, the number of wireless power signals, or the number of wireless data collection signals through a structure and to or from the sensor unit using a radio frequency window, wherein the radio frequency window is formed of a physical aperture in the structure and a material placed in the physical aperture, wherein the material facilitates the passage of at least one of the wireless response signals, the wireless power signals, or the wireless data collection signals through the radio frequency window.

5. The method of claim 4 further comprising:
   waking up a controller in a sensor unit in the group of sensor units when the number of wireless power signals is received;

making a measurement using energy derived from the number of wireless power signals; and storing the measurement as the sensor data.

6. The method of claim 5 further comprising:

sending the sensor data in wireless signals when the number of wireless data collection signals is received.

7. The method of claim 4, wherein sending the number of wireless data collection signals to the group of sensor units after the number of wireless power signals have been sent the group of sensor units comprises:

identifying an identifier for a sensor unit in the group of sensor units; and sending the identifier in the number of wireless data collection signals to the group of sensor units after the number of wireless power signals have been sent the group of sensor units.

8. The method of claim 7, wherein the steps of identifying the identifier for the sensor unit in the group of sensor units and sending the identifier in the number of wireless data collection signals to the group of sensor units after the number of wireless power signals have been sent the group of sensor units is performed sequentially for each sensor unit in the group of sensor units.

9. The method of claim 4, wherein the number of wireless power signals is selected from one of a single wireless power signal and a plurality of sequential wireless power signals.

10. A method comprising:

receiving a number of wireless power signals at a sensor unit;

making a number of measurements using a sensor at the sensor unit after receiving the number of wireless power signals;

storing the number of measurements as sensor data;

transmitting the sensor data in a number of wireless sensor data signals when a number of wireless data collections signals is received; and facilitating the passage of at least one of the number of wireless power signals, or the number of wireless data collection signals through a structure and to or from the sensor unit using a radio frequency window outside of the sensor unit, wherein the radio frequency window is formed of a physical aperture in the structure and a material placed in the physical aperture, wherein the material facilitates the passage of at least one of the wireless response signals, the wireless power signals, or the wireless data collection signals through the radio frequency window.

11. The method of claim 10, wherein the sensor unit comprises a sensor; an antenna system physically connected to the sensor, wherein the antenna system is configured to send and receive wireless signals; an energy harvesting device configured to derive energy from the wireless signals received; and a controller configured to control the sensor to make a measurement, save the measurement as the sensor data, and send the sensor data in the wireless signals.

* * * * *